(12) United States Patent
Chaiko et al.

(10) Patent No.: US 10,526,681 B2
(45) Date of Patent: Jan. 7, 2020

(54) SYSTEM AND METHOD FOR ABOVE-ATMOSPHERIC LEACHING OF METAL SULFIDES

(71) Applicants: David J. Chaiko, South Jordan, UT (US); FLSmidth A/S, Valby (DK)

(72) Inventors: David J. Chaiko, South Jordan, UT (US); Carlos Eyzaguirre, Draper, UT (US)

(73) Assignee: FLSMIDTH A/S, Valby (DK)

( * ) Notice: Subject to any disclaimer, the term of this patent is extended or adjusted under 35 U.S.C. 154(b) by 346 days.

(21) Appl. No.: 15/528,698

(22) PCT Filed: Dec. 16, 2015

(86) PCT No.: PCT/US2015/066003
§ 371 (c)(1),
(2) Date: May 22, 2017

(87) PCT Pub. No.: WO2016/100453
PCT Pub. Date: Jun. 23, 2016

(65) Prior Publication Data
US 2019/0100823 A1    Apr. 4, 2019

Related U.S. Application Data

(60) Provisional application No. 62/092,773, filed on Dec. 16, 2014.

(51) Int. Cl.
*C22B 3/00* (2006.01)
*C22B 3/08* (2006.01)
(Continued)

(52) U.S. Cl.
CPC .................. *C22B 3/08* (2013.01); *C22B 3/02* (2013.01); *C22B 3/04* (2013.01); *C22B 11/04* (2013.01);
(Continued)

(58) Field of Classification Search
CPC .... C22B 3/02; C22B 3/04; C22B 3/08; C22B 11/04; C22B 15/0067; C22B 23/0407
(Continued)

(56) References Cited

U.S. PATENT DOCUMENTS 5,232,491 A * 8/1993 Corrans .................... C22B 1/00
423/27
5,411,574 A * 5/1995 Turney ................ C22B 34/1254
423/69
(Continued)

FOREIGN PATENT DOCUMENTS

WO    2011072324 A1    6/2011

OTHER PUBLICATIONS

Positive International Preliminary Report on Patentability (Completed Dec. 31, 2016).

*Primary Examiner* — Steven J Bos
(74) *Attorney, Agent, or Firm* — Jeffrey A. Sharp

(57) ABSTRACT

A system and method for improving leach kinetics and recovery during above-atmospheric leaching of a metal sulfide is disclosed. In some embodiments, the method may comprise the steps of: (a) producing a metal sulfide concentrate [34] via flotation; (b) moving the produced metal sulfide concentrate [34] to at least one chamber [22a] of at least one reactor such as an autoclave [20]; (c) leaching the produced metal sulfide concentrate in said at least one chamber [22a] in the presence of oxygen [82] at a pressure and/or temperature above ambient, and in the presence of partially-used [25] and/or or new [92] grinding media within the at least one chamber [22a]. Systems [10] and apparatus [20, 200] for practicing the aforementioned method are also disclosed.

6 Claims, 12 Drawing Sheets

(51) Int. Cl.
 *C22B 15/00* (2006.01)
 *C22B 3/04* (2006.01)
 *C22B 3/02* (2006.01)
(52) U.S. Cl.
 CPC ...... *C22B 15/0067* (2013.01); *C22B 23/0407* (2013.01); *Y02P 10/234* (2015.11); *Y02P 10/236* (2015.11)
(58) Field of Classification Search
 USPC .................................................. 422/242, 226
 See application file for complete search history.

(56) References Cited

U.S. PATENT DOCUMENTS

| | | | |
|---|---|---|---|
| 5,458,866 A * | 10/1995 | Simmons | C01G 7/00 423/27 |
| 6,210,648 B1 * | 4/2001 | Gathje | B03D 1/02 423/26 |
| 2002/0033076 A1 | 3/2002 | Marsden et al. | |
| 2002/0152845 A1 | 10/2002 | Fleming et al. | |
| 2004/0065987 A1 | 4/2004 | Kanno et al. | |
| 2017/0356063 A1 * | 12/2017 | Chaiko | B01D 21/18 |

* cited by examiner

SYSTEM AND METHOD FOR ABOVE-ATMOSPHERIC LEACHING OF METAL SULFIDES

CROSS-REFERENCE TO RELATED APPLICATIONS

This application is a U.S. National Stage § 371 application of PCT/US2015/066003, filed on 16 Dec. 2015, which claims the benefit of U.S. Provisional Patent Application No. 62/092,773, filed on 16 Dec. 2014, both titled: "SYSTEM AND METHOD FOR ENHANCED METAL RECOVERY DURING ATMOSPHERIC LEACHING OF METAL SULFIDES". This application further relates to the following co-pending applications: PCT/US2015/050045 filed on 14 Sep. 2015, PCT/US2015/061761 filed on 20 Nov. 2014, and PCT/US2015/062000 filed on 20 Nov. 2014. The contents of these applications are hereby incorporated by reference in their entirety for any and all purposes as if fully set forth herein.

FIELD OF THE INVENTION

Embodiments of the invention relate to equipment, systems, and processes for improving metal value extraction from metal sulfide ores. In particular, systems and methods for enhancing metal dissolution and recovery during above-atmospheric pressure oxidative leaching of metal sulfide concentrates are disclosed.

BACKGROUND OF THE INVENTION

An improved method for above-atmospheric pressure oxidative leaching of metal sulphides is needed. In particular, an improved method for leaching copper sulphides such as chalcopyrite and enargite is needed.

OBJECTS OF THE INVENTION

It is preferred that embodiments of the present invention provide an apparatus, system, and process which is capable of improving the hydrometallurgical processing of primary metal sulfides (in particular, copper metal sulphides such as enargite), rapidly and/or efficiently.

It is also preferred that embodiments of the present invention reduce and/or eliminate the need for the addition of a superfluous reagent or reagents, into the leach circuit, which might cost additional money to purchase, ship, and dose; and/or which might negatively impact downstream SX/EW systems.

It is further preferred that embodiments of the present invention reduce grinding energies and/or heating energies which are typically required for leaching copper sulphides like enargite, at high solids densities, without adding superfluous catalysts.

It is further preferred that embodiments of the present invention may be advantageously configured to form catalyst products, for example, those which may comprise (or which may be used to produce) ferric oxidant.

It is further preferred that embodiments of the present invention may be advantageously configured to form products, which may comprise (or which may be used to produce) a dilute acid which could be used as a reagent.

It is further preferred that some embodiments of the disclosed methods may find particular utility in leaching slow-to-leach cobalt-containing sulfides, or refractory gold concentrates, without limitation.

These and other objects of the present invention will be apparent from the drawings and description herein. Although objects of the invention are believed to be attained by at least one embodiment of the invention, there is not necessarily any one embodiment of the invention that achieves all of the objects of the invention.

SUMMARY OF THE INVENTION

A system and method of improving leach kinetics and recovery during above atmospheric oxidative leaching of a metal sulfide is disclosed. The system and method may, in some embodiments, comprise an oxidative leach circuit or the step of utilizing an oxidative leach circuit, respectively. The oxidative leach circuit may comprise one or more shear tank reactors (as defined in the above-referenced co-pending applications) such as one or more stirred media reactors, without limitation. Shear tank reactors may, in some embodiments, comprise a stirred media reactor, a high-shear reactor comprising one or more high-shear impellers, or a high-shear reactor comprising a high shear rotor and a high shear stator. Stirred media reactors may also be referred to more generically in co-pending applications as "attrition scrubber" or labeled as "SMRt" or "smart reactor".

In some embodiments, the one or more shear tank reactors may be arranged in series (i.e., "inter-stage") between oxidative leach reactors, for example, between autoclaves which may be adjacent metal sulfide leaching autoclaves. In some embodiments, the one or more shear tank reactors may be arranged in parallel (i.e., "intra-stage") with an oxidative leach reactor. In some embodiments, one or more shear tank reactors may be operatively coupled to one or more chambers within one or more autoclaves. In some embodiments, a solid-liquid separation or dewatering step may be provided in the leach circuit, in order to address excessive concentration buildup within the system—particularly to prevent copper concentrations that exceed solubility limits and/or the SX/EW system capabilities. In some embodiments, successive chambers within a multi-chamber oxidative leach reactor may successively increase, decrease, stay the same, or vary in terms of residence time, size, and/or capacity, without limitation. In some embodiments, successive chambers of multiple single-chamber oxidative leach reactors may successively increase, decrease, stay the same, or vary in terms of residence time, size, and/or capacity, without limitation.

A system and method of improving leach kinetics and recovery during above atmospheric leaching of a metal sulfide comprising an oxidative leach step is also disclosed. The system may, in some embodiments, comprise an oxidative leach circuit comprising a reactor for leaching, such as an autoclave having at least one chamber therein. The method may comprise the step of utilizing the oxidative leach circuit to oxidize and/or leach a metal sulfide. The autoclave may have at least one chamber therein. The at least one chamber of the autoclave may comprise an amount of grinding media of a predetermined type. The grinding media may be uniform in size, diameter, shape, density, material, or type. Or, the grinding media may be non-uniform in size, diameter, shape, density, material, or type. The autoclave may comprise means for introducing and/or removing the grinding media into the at least one chamber therein. The means for introducing and/or removing grinding media may include any one or more of: a hopper, a holding tank, a pump, an inlet, an outlet, a combined inlet/outlet, at least one valve, or a combination thereof.

A method of improving leach kinetics and recovery during above-atmospheric leaching of a metal sulfide is further disclosed. The method may comprise one or more of the following steps: producing a metal sulfide concentrate via flotation; moving the produced metal sulfide concentrate to at least one chamber of at least one reactor for leaching (e.g., at least one autoclave leach reactor); and leaching the produced metal sulfide concentrate in said at least one chamber in the presence of oxygen at a pressure and/or temperature above ambient, and in the presence of partially-used and/or or new grinding media within the at least one chamber. In some embodiments, the method may further comprise the step of substantially oxidizing sulfide within the metal sulfide concentrate to sulfate. In some embodiments, the partially-used or new grinding media within the at least one chamber may be configured to make contact with the metal sulfide concentrate inside of the at least one chamber. In some embodiments, the at least one chamber may comprise partially-used or new grinding media therein. In some embodiments, the step of moving the produced metal sulfide concentrate to at least one chamber of at least one autoclave may involve receiving produced metal sulfide concentrate into the at least one autoclave via a first inlet. In some embodiments, the method may comprise the step of extracting leached slurry from the at least one autoclave via a first outlet. In some embodiments, the leached slurry may comprise partially-used grinding media which is past a useable life. In some embodiments, the method may further comprise the step of introducing new grinding media to the at least one autoclave via means for introducing new grinding media. In some embodiments, the means for introducing new grinding media to the at least one autoclave may comprise one or more hoppers, one or more a holding chambers, one or more grinding media holders, and/or one or more pumps, without limitation. In some embodiments, the one or more pumps may be positive displacement pumps which are configured to move said new grinding media into the at least one autoclave. In some embodiments, the grinding media may comprise ceramic grinding beads. In some embodiments, the metal sulfide concentrate being leached within the leach system may comprise enargite. In some embodiments, the means for introducing new grinding media to the at least one autoclave may comprise a number of inlets, a number of outlets, and a number of valves, without limitation.

In some embodiments, the step of substantially oxidizing sulfide within the metal sulfide concentrate to sulfate may be carried out under 220° C. and above 70° C. In some embodiments, the step of substantially oxidizing sulfide within the metal sulfide concentrate to sulfate may be carried out under 215° C. and above 70° C. In some embodiments, the step of substantially oxidizing sulfide within the metal sulfide concentrate to sulfate may be carried out under 210° C. and above 70° C. In some embodiments, the step of substantially oxidizing sulfide within the metal sulfide concentrate to sulfate may be carried out under 205° C. and above 70° C. In some embodiments, the step of substantially oxidizing sulfide within the metal sulfide concentrate to sulfate may be carried out under 200° C. and above 70° C. In some embodiments, the step of substantially oxidizing sulfide within the metal sulfide concentrate to sulfate may be carried out under 195° C. and above 70° C. In some embodiments, the step of substantially oxidizing sulfide within the metal sulfide concentrate to sulfate may be carried out under 190° C. and above 70° C. In some embodiments, the step of substantially oxidizing sulfide within the metal sulfide concentrate to sulfate may be carried out under 185° C. and above 70° C. In some embodiments, the step of substantially oxidizing sulfide within the metal sulfide concentrate to sulfate may be carried out under 180° C. and above 70° C. In some embodiments, the step of substantially oxidizing sulfide within the metal sulfide concentrate to sulfate may be carried out under 175° C. and above 70° C. In some embodiments, the step of substantially oxidizing sulfide within the metal sulfide concentrate to sulfate may be carried out under 170° C. and above 70° C. In some embodiments, the step of substantially oxidizing sulfide within the metal sulfide concentrate to sulfate may be carried out under 165° C. and above 70° C. In some embodiments, the step of substantially oxidizing sulfide within the metal sulfide concentrate to sulfate may be carried out under 160° C. In some embodiments, the step of substantially oxidizing sulfide within the metal sulfide concentrate to sulfate may be carried out under 155° C. and above 70° C. In some embodiments, the step of substantially oxidizing sulfide within the metal sulfide concentrate to sulfate may be carried out under 150° C. and above 70° C. In some embodiments, the step of substantially oxidizing sulfide within the metal sulfide concentrate to sulfate may be carried out under 145° C. and above 70° C. In some embodiments, the step of substantially oxidizing sulfide within the metal sulfide concentrate to sulfate may be carried out under 140° C. and above 70° C. In some embodiments, the step of substantially oxidizing sulfide within the metal sulfide concentrate to sulfate may be carried out under 135° C. and above 70° C. In some embodiments, the step of substantially oxidizing sulfide within the metal sulfide concentrate to sulfate may be carried out under 130° C. and above 70° C. In some embodiments, the step of substantially oxidizing sulfide within the metal sulfide concentrate to sulfate may be carried out under 125° C. and above 70° C. In some embodiments, the step of substantially oxidizing sulfide within the metal sulfide concentrate to sulfate may be carried out under 120° C. and above 70° C. In some embodiments, the step of substantially oxidizing sulfide within the metal sulfide concentrate to sulfate may be carried out under 115° C. and above 70° C. In some embodiments, the step of substantially oxidizing sulfide within the metal sulfide concentrate to sulfate may be carried out under 110° C. and above 70° C. In some embodiments, the step of substantially oxidizing sulfide within the metal sulfide concentrate to sulfate may be carried out under 105° C. and above 70° C. In some embodiments, the step of substantially oxidizing sulfide within the metal sulfide concentrate to sulfate may be carried out under 100° C. and above 70° C. In some embodiments, the step of substantially oxidizing sulfide within the metal sulfide concentrate to sulfate may be carried out under 155° C. and above 70° C.

In some embodiments, for example metal sulfides comprising enargite, it may be particularly advantageous for the step of substantially oxidizing sulfide within the metal sulfide concentrate to sulfate to be carried out under the melting point of sulfur (approximately above 115 and below 122° C., or between approximately 118-120° C.), and above room temperature (or ambient temperature), without limitation. By preventing elemental sulfur from entering a liquid state, passivation may be avoided.

The step of substantially oxidizing sulfide within the metal sulfide concentrate to sulfate may be carried out between about 70° C. and about 118° C., or between about 80° C. and about 118° C. In some embodiments, the step of substantially oxidizing sulfide within the metal sulfide concentrate to sulfate may be carried out between about 90° C. and about 118° C., or between about 100° C. and about 118°

C. In some embodiments, the step of substantially oxidizing sulfide within the metal sulfide concentrate to sulfate may be carried out between about 110° C. and about 118° C. In some embodiments, the step of substantially oxidizing sulfide within the metal sulfide concentrate to sulfate may be carried out between about 70° C. and about 120° C., or between about 80° C. and about 120° C. In some embodiments, the step of substantially oxidizing sulfide within the metal sulfide concentrate to sulfate may be carried out between about 90° C. and about 120° C., or between about 100° C. and about 120° C. In some embodiments, the step of substantially oxidizing sulfide within the metal sulfide concentrate to sulfate may be carried out between about 110° C. and about 120° C.

Embodiments which might require substantial or complete oxidation of a metal sulfide (e.g., of the iron metal sulfide pyrite) in order to make acid, the step of substantially oxidizing sulfide within the metal sulfide concentrate to sulfate may be further carried out above 100° C. and less than 220° C. In some embodiments, the step of substantially oxidizing sulfide within the metal sulfide concentrate to sulfate may be further carried out above 110° C. and less than 220° C. In some embodiments, the step of substantially oxidizing sulfide within the metal sulfide concentrate to sulfate may be further carried out above 120° C. and less than 220° C. In some embodiments, the step of substantially oxidizing sulfide within the metal sulfide concentrate to sulfate may be further carried out above 130° C. and less than 220° C. In some embodiments, the step of substantially oxidizing sulfide within the metal sulfide concentrate to sulfate may be further carried out above 140° C. and less than 220° C. In some embodiments, the step of substantially oxidizing sulfide within the metal sulfide concentrate to sulfate may be further carried out above 150° C. and less than 220° C. In some embodiments, the step of substantially oxidizing sulfide within the metal sulfide concentrate to sulfate may be further carried out above 160° C. and less than 220° C. In some embodiments, the step of substantially oxidizing sulfide within the metal sulfide concentrate to sulfate may be further carried out above 170° C. and less than 220° C. In some embodiments, the step of substantially oxidizing sulfide within the metal sulfide concentrate to sulfate may be further carried out above 180° C. and less than 220° C. In some embodiments, the step of substantially oxidizing sulfide within the metal sulfide concentrate to sulfate may be further carried out above 190° C. and less than 220° C. In some embodiments, the step of substantially oxidizing sulfide within the metal sulfide concentrate to sulfate may be further carried out above 200° C. and less than 220° C., without limitation.

In some embodiments, the step of substantially oxidizing sulfide within the metal sulfide concentrate to sulfate may be carried out between about 110° C. and about 145° C. In some embodiments, the step of substantially oxidizing sulfide within the metal sulfide concentrate to sulfate may be carried out between about 120° C. and about 150° C. In some embodiments, the step of substantially oxidizing sulfide within the metal sulfide concentrate to sulfate may be carried out between about 125° C. and about 155° C. In some embodiments, the step of substantially oxidizing sulfide within the metal sulfide concentrate to sulfate may be carried out between about 135° C. and about 150° C. In some embodiments, the step of substantially oxidizing sulfide within the metal sulfide concentrate to sulfate may be carried out between about 140° C. and about 150° C. In some embodiments, the step of substantially oxidizing sulfide within the metal sulfide concentrate to sulfate may be carried out at approximately 145° C.

In some embodiments, the step of substantially oxidizing sulfide within the metal sulfide concentrate to sulfate may be carried out between approximately 100° C. and 220° C. In some embodiments, the at least one autoclave may be configured as a stirred media reactor. In some embodiments, the at least one autoclave may further comprise at least one stirred media reactor.

In some embodiments, an autoclave may be configured for leaching a metal sulfide, in particular, enargite. The autoclave may comprise at least one compartment, a first inlet for receiving a metal sulfide concentrate (for example, a sulfide concentrate produced via flotation), a first outlet for removing a leached slurry from the autoclave, and means for introducing grinding media to one or more internal portions of the autoclave. In some embodiments, means for introducing grinding media to the autoclave may comprise one or more hoppers, one or more a holding chambers, one or more grinding media holders, and/or one or more pumps [60]. In some embodiments, the one or more pumps may comprise positive displacement pumps which are configured to move grinding media. In some embodiments, the grinding media may comprise ceramic grinding beads, without limitation. In some preferred embodiments, the metal sulfide concentrate may comprise enargite.

A method of leaching a metal sulfide disclosed herein may comprise the step of (a) providing a metal sulfide concentrate [34] to at least one chamber [22a] of at least one reactor, [20] which may comprise grinding media therein. The method may further comprise the step of (b) leaching the metal sulfide concentrate in the at least one chamber [22a] in the presence of oxygen [82] at a pressure or temperature above ambient, and in the presence of the grinding media within the at least one chamber [22a]. The grinding media used within the at least one chamber [22a] may contact the metal sulfide concentrate [34] inside of the at least one chamber [22a] and oxidize the metal sulfide. The method may further comprise (d) oxidizing the metal sulfide within the metal sulfide concentrate [34] to a metal sulfate. In some embodiments, the grinding media may comprise partially-used [25] or new [92] grinding media. In some embodiments, the at least one reactor may comprise an autoclave.

In some embodiments, the method may further comprise the step of (e) extracting leached slurry [52] from the at least one reactor [20] via a first outlet [28a]. In some embodiments, the leached slurry [52] may comprise partially-used [25] grinding media. In some embodiments, the method may further comprise the step of (e) introducing new grinding media [92] to the at least one reactor [20]. In some embodiments, the new grinding media [92] may be introduced into the at least one reactor [20] using one or more hoppers [90].

In some embodiments, the new grinding media [92] may be introduced into the at least one reactor [20] using one or more a holding chambers [96a-d] which may serve to hold new grinding media [92]. In some embodiments, the new grinding media [92] may be introduced into the at least one reactor [20] using a grinding media holder [96]. In some embodiments, the new grinding media [92] may be introduced into the at least one reactor [20] using one or more pumps [60]. In some embodiments, the one or more pumps [60] may comprise positive displacement pumps.

In some embodiments, the grinding media [92] may comprise ceramic grinding beads. However, "Grinding media" [92], where used herein, and where used in the appending claims, may comprise a foreign material which is non-native to the metal sulfide (or a concentrate thereof), and may include any one or more of the following alone, or in combination, without limitation: high-density media (e.g., ceramic, high-density ceramic, or metal beads, balls, ceramic vibratory tumbling/deburring media, materials of various shapes such as cylinders, spheres, angle-cut cylinders, angle-cut triangular prisms, straight cut triangular prisms, angle-cut elliptical prisms, angle-cut tristars, cylindrical wedges, cones, etc.), particulate media (e.g., silica, sand, quartz, smelter slag, polytetrafluoroethylene), low-density media (e.g., polymeric materials of various shapes such as cylinders, spheres, angle-cut cylinders, angle-cut triangular prisms, straight cut triangular prisms, angle-cut elliptical prisms, angle-cut tristars, cylindrical wedges, cones, etc., plastic vibratory tumbling/deburring media, shredded tire or conveyor belt material, carbon, synthetic media). For example, in some embodiments, ceramic media in the form of uniformly-sized beads may be used, without limitation.

In some embodiments, the metal sulfide concentrate comprises enargite, from which copper (Cu) may be extracted. In some embodiments, the metal sulfide concentrate may comprise Cobalt (Co), for example, a slow-leaching cobalt sulfide from which cobalt (Co) may be extracted, without limitation. In some embodiments, the metal sulfide concentrate may comprise an iron sulfide, such as pyrite ($FeS_2$), which can be completely oxidized and used to make or generate an acid, for example, a dilute acid, without limitation. In some embodiments, the metal sulfide concentrate may be used to produce ferric oxidant for use as a catalyst (e.g., for an upstream leach circuit), without limitation.

In some embodiments, (e.g., for processing a metal sulfide concentrate comprising enargite), the step of oxidizing the metal sulfide may be carried out at a temperature ranging from about ambient temperature to about 120° C., without limitation. In some embodiments, the step of oxidizing the metal sulfide may be carried out at a temperature ranging from about 70° C. to about 120° C. In some embodiments, the step of oxidizing the metal sulfide may be carried out at a temperature ranging from about 80° C. to about 120° C. In some embodiments, (e.g., for metal sulfide concentrate comprising enargite), the step of oxidizing the metal sulfide may be carried out at a temperature ranging from about 80° C. to about the melt point of sulfur or elemental sulfur, without limitation. In some embodiments, the step of oxidizing the metal sulfide may be carried out at a temperature ranging from about 70° C. to about 115° C.

In some embodiments, the step of oxidizing the metal sulfide may be carried out at a temperature ranging from about 100 to about 220° C. In some embodiments, the step of oxidizing the metal sulfide is carried out at a temperature ranging from about 105 to about 210° C. In some embodiments, the step of oxidizing the metal sulfide is carried out at a temperature ranging from about 110 to about 200° C. In some embodiments, the step of oxidizing the metal sulfide is carried out at a temperature ranging from about 115 to about 190° C. In some embodiments, the step of oxidizing the metal sulfide is carried out at a temperature ranging from about 120 to about 180° C. In some embodiments, the step of oxidizing the metal sulfide is carried out at a temperature ranging from about 125 to about 170° C. In some embodiments, the step of oxidizing the metal sulfide is carried out at a temperature ranging from about 130 to about 160° C. In some embodiments, the step of oxidizing the metal sulfide is carried out at a temperature ranging from about 135 to about 150° C. In some embodiments, the step of oxidizing the metal sulfide is carried out at a temperature ranging from about 140 to about 150° C. In some embodiments, the step of oxidizing the metal sulfide is carried out at a temperature of about 145° C.

In some embodiments, the step of oxidizing the metal sulfide is carried out between about 70° C. and the melting temperature of sulfur, wherein the metal sulfide is enargite. In some embodiments, the step of oxidizing the metal sulfide is carried out between about 80° C. and 115° C. In some embodiments, step (d) may comprise oxidizing substantially all of the metal sulfide within the metal sulfide concentrate [34] to a metal sulfate, wherein completing step (d) oxidizes substantially all of the metal sulfide within the metal sulfide concentrate [34] to a metal sulfate. In some embodiments, the at least one reactor [20] may comprise a stirred media reactor [200].

In some preferred embodiments, an autoclave [20] may be configured for leaching a metal sulfide. In some embodiments, the autoclave [20] may comprise at least one compartment [22a], a first inlet [27a] for receiving a metal sulfide concentrate [34] produced via flotation, a first outlet [28a] for removing a leached slurry [52] from the autoclave [20], and means for introducing new grinding media [92] to the at least one compartment of the autoclave [20]. In some embodiments, the means for introducing the new grinding media [92] to the autoclave [20] comprises one or more hoppers [90]. In some embodiments, the means for introducing the new grinding media [92] to the autoclave [20] comprises one or more a holding chambers [96a-d]. In some embodiments, the means for introducing the new grinding media [92] to the autoclave [20] comprises a grinding media holder [96]. In some embodiments, the means for introducing the new grinding media [92] to the autoclave [20] comprises one or more pumps [60]. In some embodiments, the one or more pumps [60] are positive displacement pumps. In some embodiments, the new grinding media [92] comprises ceramic grinding beads. In some embodiments, the metal sulfide concentrate comprises enargite. In some embodiments, the autoclave may be configured as a stirred media reactor [200]. In some embodiments, the autoclave may further comprise at least one stirred media reactor [200] connected to the autoclave. In some embodiments, the autoclave may be configured to leach copper (Cu) from the metal sulfide. In some embodiments, the autoclave may be configured to leach gold (Au) from the metal sulfide. In some embodiments, the autoclave may be configured to leach cobalt (Co) from the metal sulfide.

In some embodiments, an autoclave may be configured to make acid from the metal sulfide which may be configured for use in upstream leaching. For example, in some embodiments, the acid made from the metal sulfide may comprise a dilute acid. In some embodiments, the metal sulfide may comprise a double-refractory gold concentrate. In some embodiments, the metal sulfide may comprise pyrite (FeS2). In some embodiments, the pyrite (FeS2) may be used to make the acid, without limitation.

In some embodiments, the autoclave may be configured to make a ferric oxidant from the metal sulfide, wherein the ferric oxidant may be configured for use in upstream leaching. For example, in some embodiments, the metal sulfide may comprise pyrite (FeS2). In some embodiments, the pyrite (FeS2) may be used to make a product comprising ferric oxidant, without limitation.

According to some embodiments, an autoclave for leaching a metal sulfide may comprise: a first inlet [27a] for receiving a metal sulfide concentrate [34] produced via flotation; a second inlet [27b] for receiving a liquid or gas containing oxygen; a third inlet [27c] for receiving new grinding media [92]; a first outlet [28a] for removing a leached slurry [52] from the autoclave [20]; a second outlet [28b] for gas discharge; and at least one compartment [22a] configured to contain grinding media. The grinding media may be configured to disrupt a crystal lattice structure of metal sulfide particles in the metal sulfide concentrate [34], fracture metal sulfide particles in the metal sulfide concentrate [34], mechano-chemically process metal sulfide particles in the metal sulfide concentrate [34], and/or physico-chemically process metal sulfide particles in the metal sulfide concentrate [34], without limitation.

Above-atmospheric pressure oxidative leaching described throughout this specification may stand alone in a leach circuit, or it may be preceded by one or more pretreatment processes, such as a flotation leach process described in WO/2015/095054 (which is incorporated herein by reference) or a reductive pretreatment or leach process, without limitation.

BRIEF DESCRIPTION OF THE DRAWINGS

To complement the description which is being made, and for the purpose of aiding to better understand the features of the invention, a set of drawings illustrating preferred apparatus and methods of using the same is attached to the present specification as an integral part thereof, in which the following has been depicted with an illustrative and non-limiting character. It should be understood that like reference numbers used in the drawings (if any are used) may identify like components.

Figure 1:
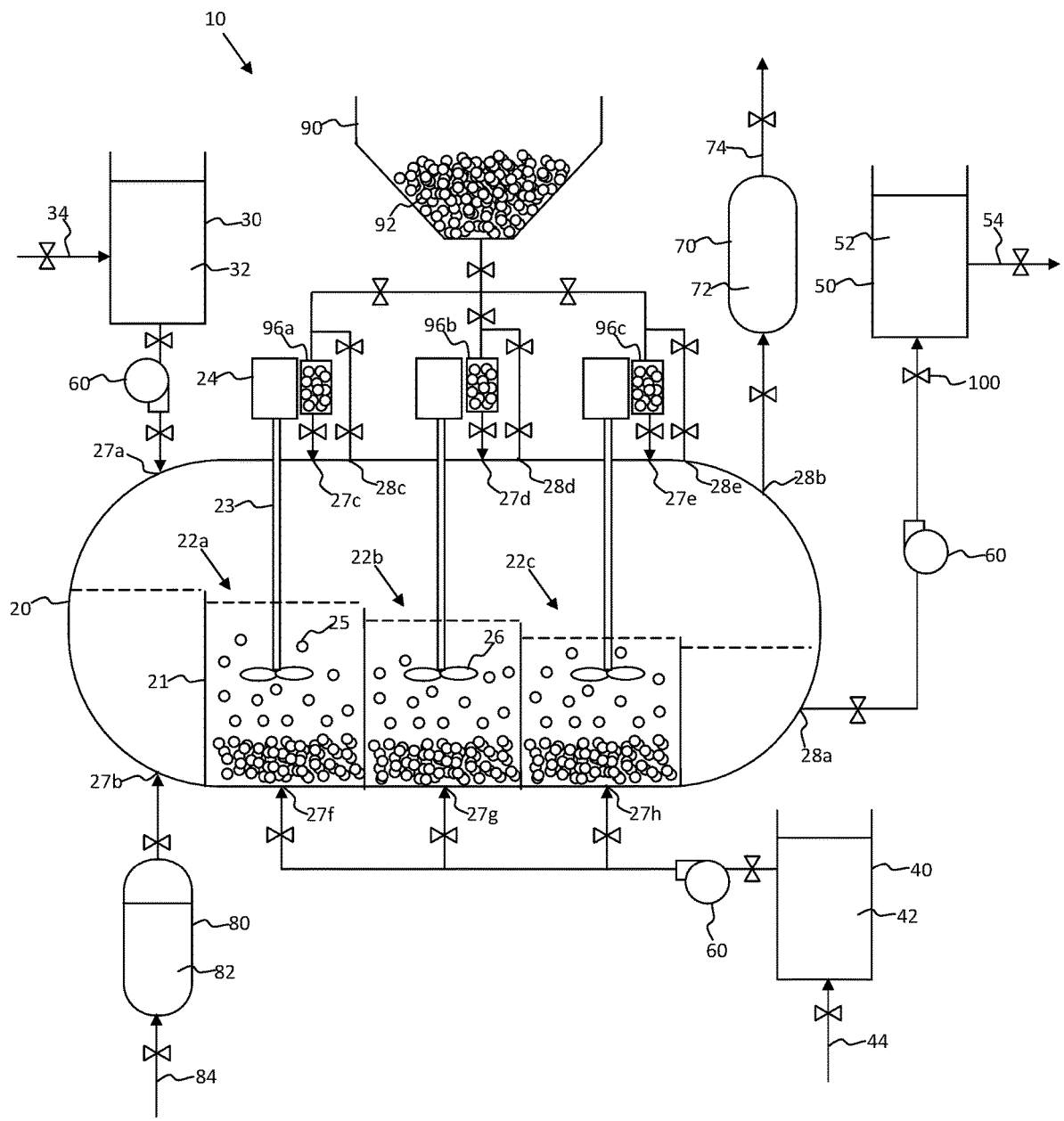
FIG. 1 is a schematic diagram illustrating a non-limiting, exemplary portion of a flowsheet which may comprise an oxidative leach circuit comprising a reactor for leaching such as an autoclave configured with multiple compartments and grinding media; wherein grinding media may be provided to one or more of the compartments via grinding media introduction/removal means such as a hopper and gravity.
Figure 2:
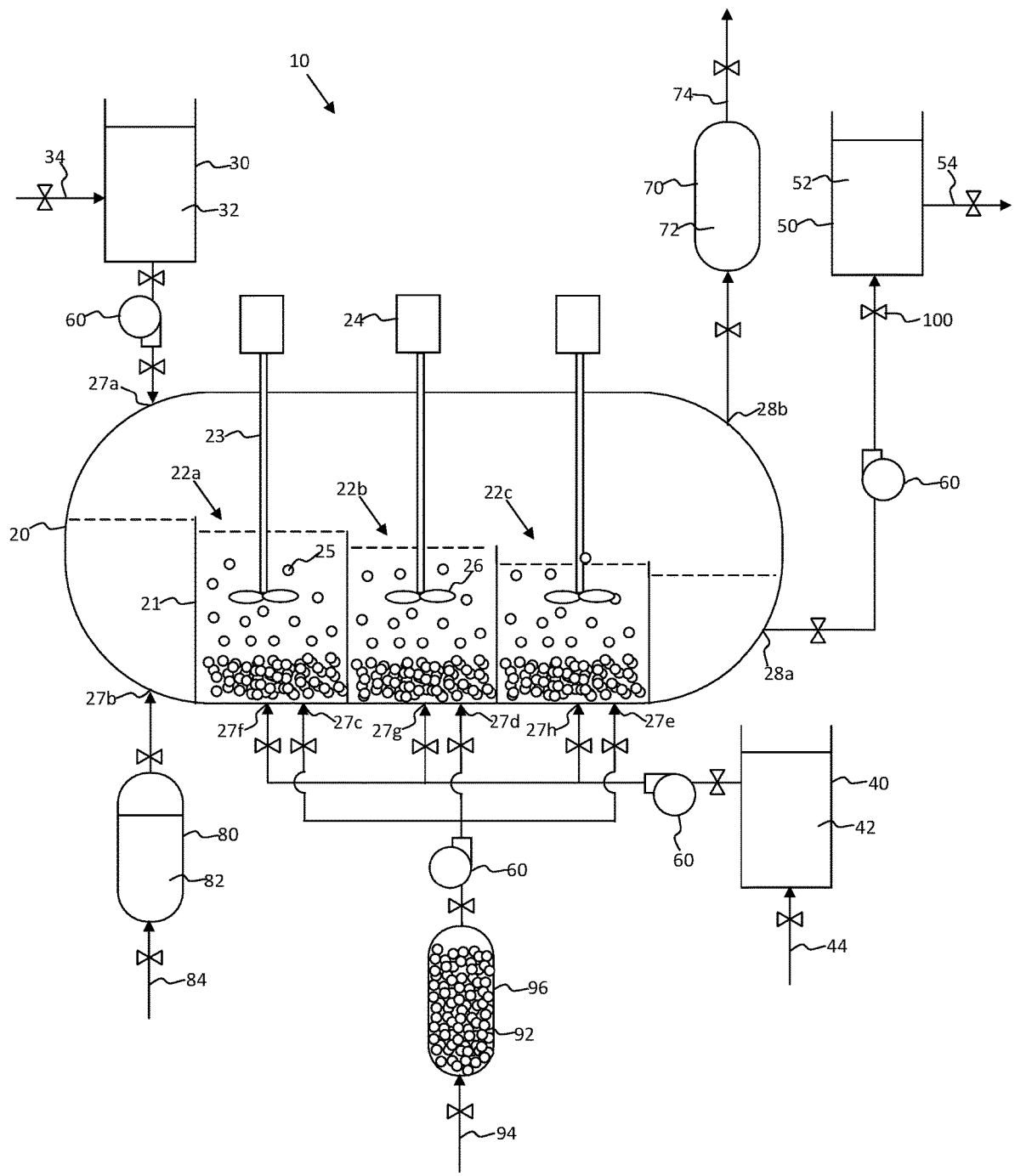
FIG. 2 is a schematic diagram illustrating a non-limiting, exemplary portion of a flowsheet which may comprise an oxidative leach circuit comprising a reactor for leaching such as an autoclave configured with multiple compartments and grinding media; wherein grinding media may be provided to one or more of the compartments via a positive displacement pump, without limitation.
Figure 3A:
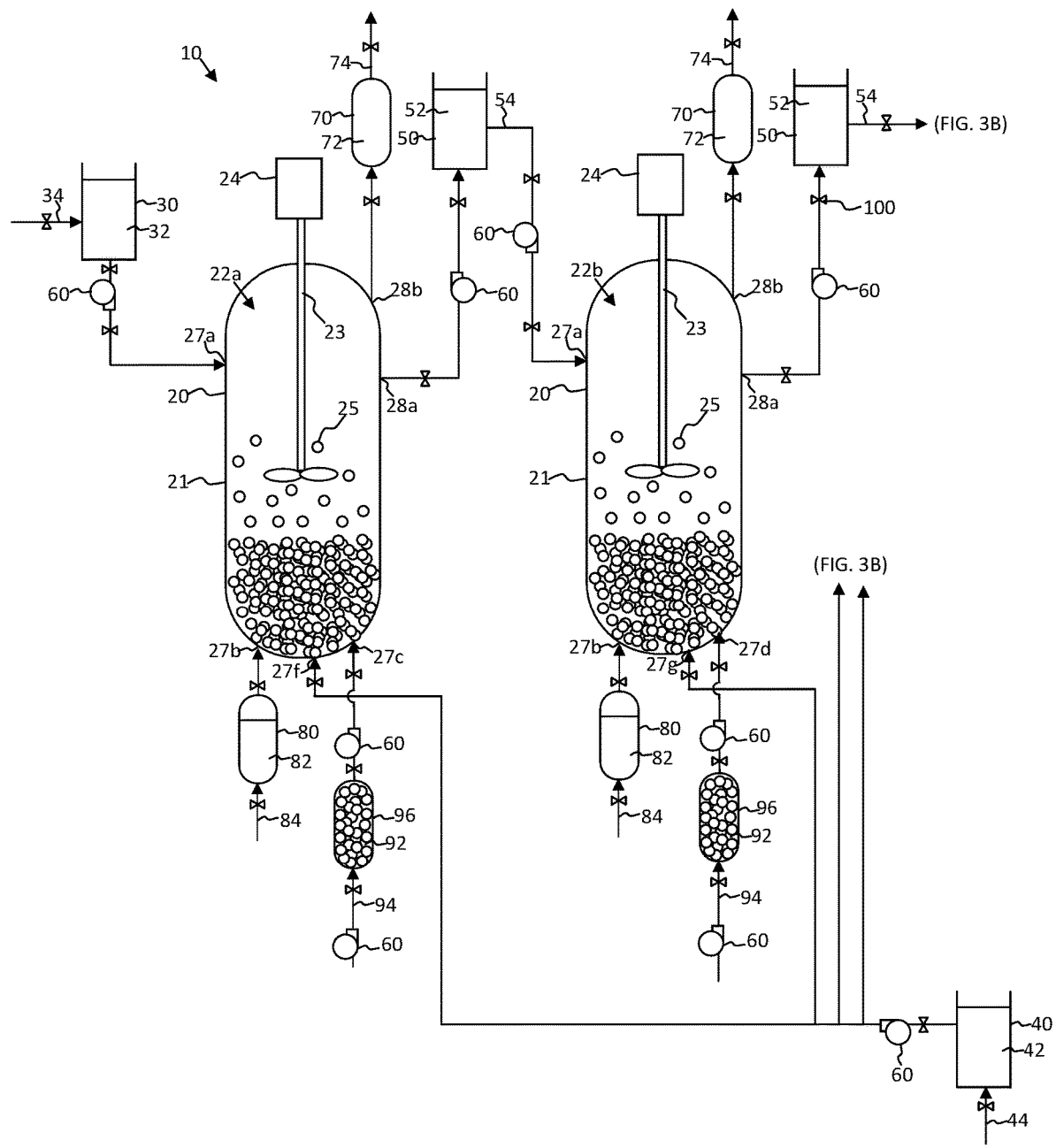
FIGS. 3A-3B collectively illustrate a non-limiting, exemplary portion of a flowsheet which may comprise an oxidative leach circuit comprising multiple reactors for leaching such as multiple autoclaves, each reactor being configured with and/or configured to receive grinding media; wherein grinding media may be provided to one or more of the reactors via a positive displacement pump, without limitation. It should be understood that not every one of the multiple reactors may comprise grinding media.
Figure 3B:
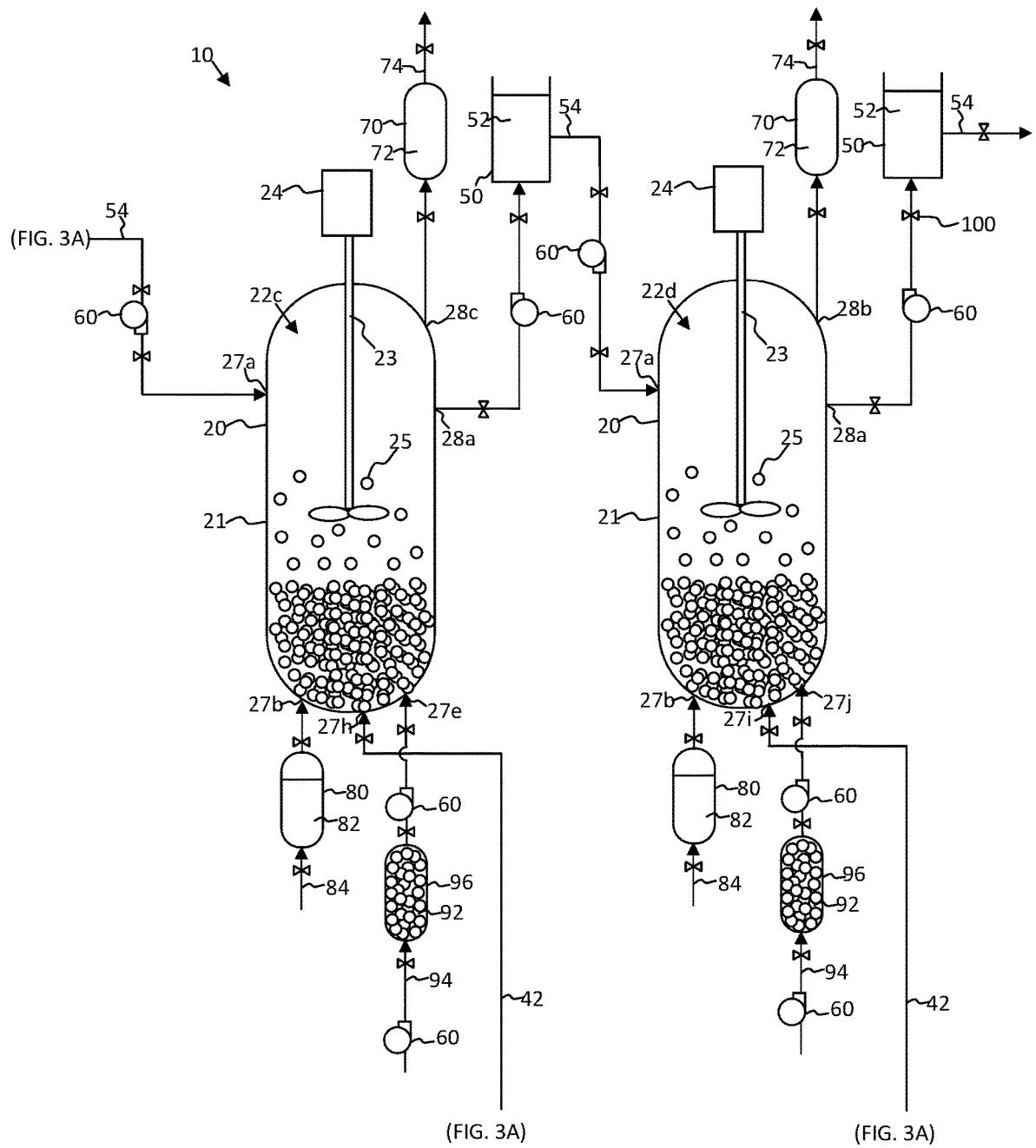
Figure 4A:
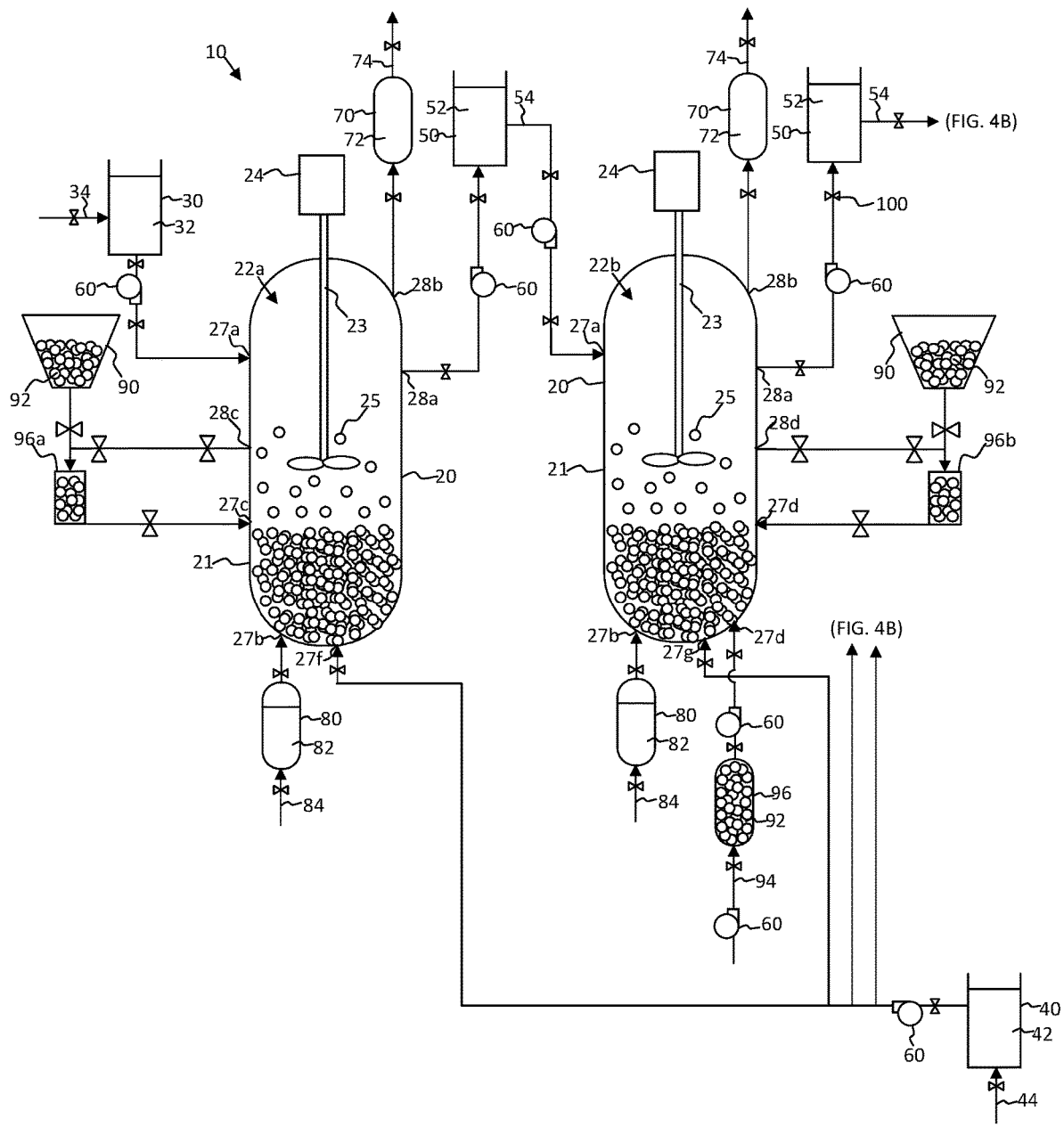
FIGS. 4A-4B collectively illustrate a non-limiting, exemplary portion of a flowsheet which may comprise an oxidative leach circuit comprising multiple reactors for leaching such as multiple autoclaves, each autoclave being configured with and/or configured to receive grinding media; wherein grinding media may be provided to one or more of the autoclaves via a hopper (and gravity), via at least one positive displacement pump, and/or combinations thereof.
Figure 4B:
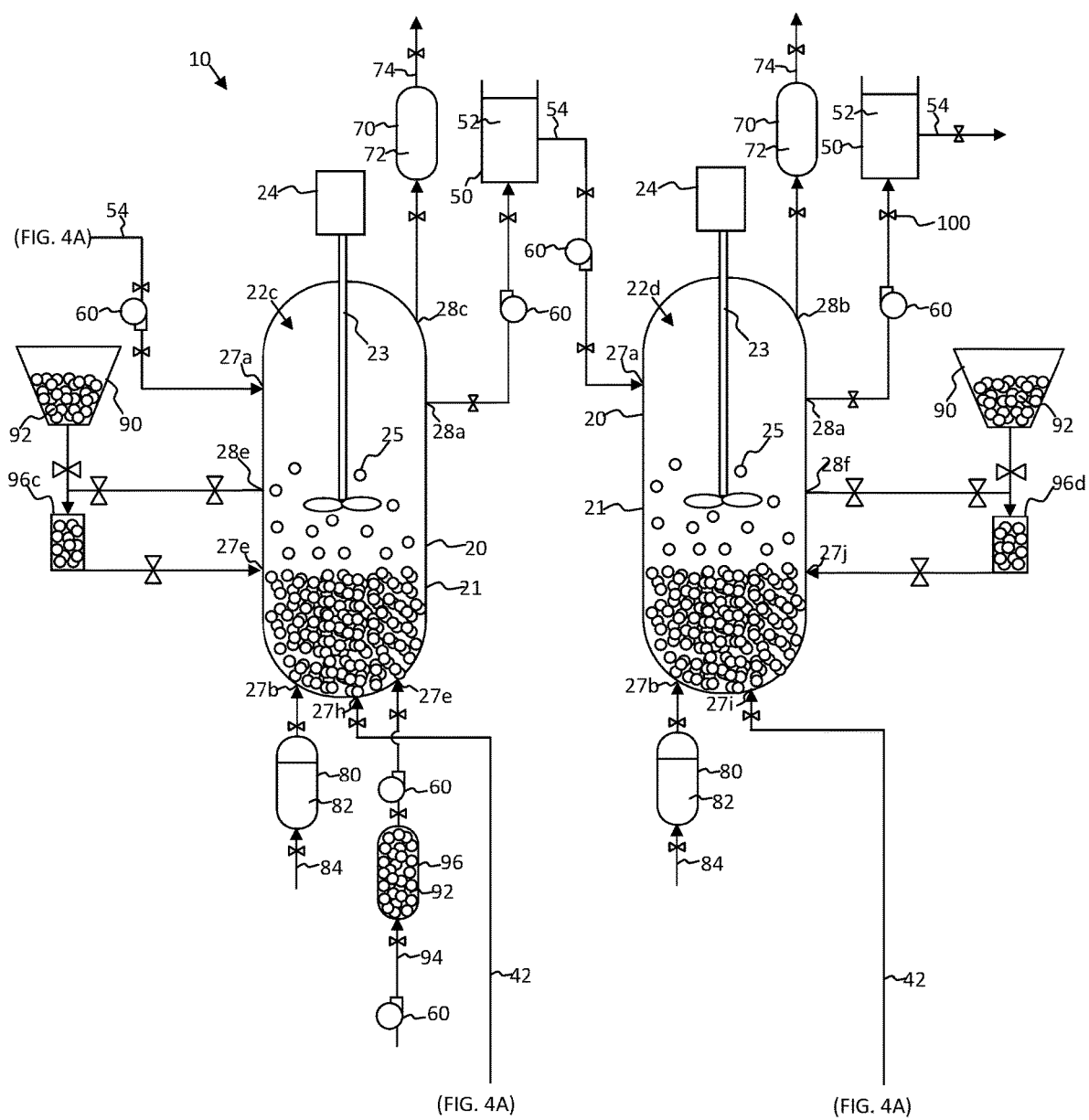

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

FIGS. 1-4B suggest non-limiting embodiments wherein a portion of a metal recovery flowsheet may comprise an oxidative metal leach circuit comprising at least one leach reactor, such as at least one autoclave. The metal recovery flowsheet may comprise a copper, a gold, a cobalt, or an iron recovery flowsheet, without limitation. The at least one leach reactor/autoclave may be configured with grinding media, optional grinding media introduction means, and/or optional grinding media removal means. In some preferred embodiments, grinding media 25 may be allowed to eventually degrade into small pieces which then may become part of the flow of concentrate slurry being leached and may be carried out of the system. In some embodiments, the optional grinding media introduction means may be used to introduce new grinding media 92 only after stirrer means 26 has started rotating, has achieved a minimum RPM, and/or has arrived at or approached operating RPM. In this regard, start-up torques can be minimized, and gradually increased over time to avoid premature motor or transmission wear, as well as stall-out conditions. It is also possible that an inching drive or supplemental starter motor and gearing could be used at the time of commissioning of a reactor or an autoclave comprising grinding media according to embodiments of the present invention.

Grinding media may 92 be provided to a reactor/autoclave 20 (e.g., via the optional grinding media introduction means or during assembly and/or manufacturing of the reactor/autoclave 20) so as to disrupt a crystal lattice structure within particles of the slurry being leached (as previously described in the aforementioned co-pending applications). As suggested in FIGS. 5-7, rather than, or in addition to a reactor/autoclave 20 having grinding media therein and/or grinding media introduction means, grinding media 92 may alternatively be provided to one or more external reactors, such as stirred media reactors (aka "SMRt" reactors or "attrition scrubbers" or "high shear reactors" comprising grinding media). The one or more stirred media reactors may be configured with some autoclave features (that is, they may be configured with the ability to hold pressure and/or accommodate high temperatures—preferably temperatures between room temperature and 220° C.).

A leach system 10 may comprise one or more reactors such as one or more autoclaves 20. The one or more reactors/autoclaves 20 may comprise one or more features of a modified autoclave, or a capped stirred media reactor (e.g., a sealed or capped "SMRt" reactor or attrition scrubber), without limitation. The one or more reactors/autoclaves 20 may each comprise one or more separation walls 21. The one or more separation walls 21 may define one or more chambers 22a, 22b, 22c, 22d within the one or more reactors/autoclaves 20. The one or more chambers 22a, 22b, 22c, 22d may comprise at least a first chamber 22a. In some embodiments, a second chamber 22b, a third chamber 22c, and/or a fourth chamber 22d may be employed. More or less chambers 22a, 22b, 22c, 22d may be employed. Chambers 22a, 22b, 22c, 22d may be similarly configured or configured uniquely with respect to each other. For example, a first chamber 22a may comprise the same type of new grinding media 92 as what is used in a second chamber 22b. In another non-limiting example, a first chamber 22a may comprise a new grinding media 92 which is different than new grinding media 92 used in a second chamber 22b.

In some embodiments, each chamber of the one or more reactors/autoclaves 20 may comprise a shaft 23 powered by a drive 24. The drive 24 may, for example and without limitation, include an electric or hydraulic motor, transmission, gearing, and/or various combinations thereof. Stirrer means 26, which may include, for example, one or more impellers, paddles, rotors, hydrofoils, stirring devices, stirrer rods, combinations thereof, and/or the like may be employed and components thereof preferably attached to a portion of the shaft 23 which is opposite the drive 24. In some embodiments, as shown, the stirrer means 26 may be connected to the shaft 23 adjacent a distal portion of the shaft 23, such as at a distal end of the shaft 23. In some embodiments (not shown), stirrer means 26 may be distributed along different portions of shaft 23, including middle portions thereof, without limitation. It should be understood that while only one hydrofoil is shown in the drawings, multiple stirrer means 26 may be provided to the shaft 23 along one or more portions of the shaft 23, without limitation.

Within each chamber 22a, 22b, 22c, 22d, grinding media 25, which is in-use (or being used), may be engaged directly or influenced indirectly by the stirrer means 26 and moved about within its respective chamber 22a, 22b, 22c, 22d. The in-use or used grinding media 25 may collide into particles of incoming concentrate (e.g., received from upstream preconditioning tank not shown). Individual pieces of the in-use or used grinding media 25 may also collide into and/or collide into each other. The in-situ grinding media 25 may serve to brush off, fracture, destroy, alter, or disturb passivation layers which might form on leached particles within the incoming concentrate 32. The in-situ grinding media 25 may also serve to disrupt underlying crystal lattice structures within unleached and/or partially-leached particles within the incoming concentrate 32. The in-situ grinding media 25 may further serve to mechano-chemically activate or re-mechano-chemically activate unleached and/or partially-leached particles within the at least one reactor/autoclave 20. The in-situ grinding media 25 may further serve to physico-chemically activate or re-physico-chemically activate unleached and/or partially-leached particles within the at least one reactor/autoclave 20. Grinding media 25 which has been pulverized past a usable life may become suspended in the slurry and eventually make its way to a first outlet 28a for slurry discharge.

Alternatively, in some embodiments it may be desired to maintain a particle size distribution of grinding media 25 within the one or more leach reactors/autoclaves 20. While not explicitly illustrated, in such circumstances, used grinding media 25 may be withdrawn from one or more specially-configured lower outlets positioned adjacent one or more respective chambers 22a, 22b, 22c, 22d. Such specially-configured lower outlets may resemble the first 28k, second 28m, and third 28n outlets for moving slurry to a stirred media reactor shown in FIG. 6; however, rather than entering a stirred media reactor, the extracted slurry may be separated or otherwise removed from media 25, the slurry may be returned to the system, and the media 25 may be washed, screened, discarded, or recycled. One or more valves 100 placed in line and adjacent to the one or more specially-configured lower outlets may enable intermittent extraction of grinding media 25.

The one or more leach reactors/autoclaves 20 may comprise, without limitation, a first inlet 27a for the ingress of concentrate 32 produced by an upstream concentrator (not shown). The concentrate 32 may have already been slurried with acid in an upstream pre-conditioning tank (not shown), or acid may be added to the concentrate holding tank 30. The one or more reactors/autoclaves 20 may also comprise a second inlet 27b for liquid and/or gas ingress (e.g., the introduction of liquid and/or gaseous oxygen), a first inlet 27c for receiving new grinding media 92, a second inlet 27d for receiving new grinding media 92, and a third inlet 27e for receiving new grinding media 92. The first 27c, second 27d, and third 27e inlets may be arranged to feed first 22a, second 22b, and third 22c chambers, respectively (e.g., arranged to be vertically in line with each chamber).

While not shown, the new media 92 may also, or alternatively, be added to a concentrate holding tank 30 (e.g., a holding tank which may be positioned downstream from a preconditioning tank and upstream of the one or more leach reactors/autoclaves 20). In this regard, stored concentrate 32 contained within the concentrate holding tank 30 may serve as means for conveying and introducing grinding media 92 to a reactor/autoclave 20. In other words, the incoming concentrate 32 may carry the new grinding media 92 into one or more chambers 22a, 22b, 22c, 22d of the one or more reactors/autoclaves 20 by virtue of the flow of the concentrate 32 into the one or more reactors; autoclaves 20. The one or more reactors/autoclaves 20 may further comprise, without limitation, a first inlet 27f for introducing recycled raffinate 42 (e.g., Cu raffinate), a second inlet 27g for recycled raffinate 42, a third inlet 27h for recycled raffinate 42, and/or even a fourth inlet 27i for recycled raffinate 42. First 27f, second 27d, third 27e, and fourth 27i inlets for recycled raffinate 42 may be arranged so as to feed first 22a, second 22b, third 22c, and fourth 22d chambers, respectively.

The one or more reactors/autoclaves 20 may further comprise, without limitation, a second outlet for gas discharge 28b (wherein gas produced during chemical reactions within the one or more autoclaves 20 may be expelled/exhausted), a first outlet 28c for freeboard gas flushing of grinding media which may be stored in a first grinding media holding chamber 96a, a second inlet 28d for freeboard gas flushing of grinding media which may be stored in a second grinding media holding chamber 96b, and a third outlet 28e for freeboard gas flushing of grinding media which may be stored in a third grinding media holding chamber 96c. One or more valves 100 may be positioned between the vessel body of the one or more reactors/autoclaves 20, and a respective grinding media holding chamber 96a, 96b, 96c.

In instances wherein a fourth chamber 22d is utilized in the leach system 10, a fourth outlet 28f for freeboard gas flushing of new grinding media 92 which may be stored in a fourth grinding media holding chamber 96d, may be advantageously employed and utilized. A fourth inlet 27j for introducing new grinding media may be provided to the at least one reactor/autoclave 20 for enabling ingress of new grinding media to the fourth chamber 22d.

The concentrate holding tank 30, which may be configured to receive incoming concentrate 34 from a preconditioning tank (not shown), and also configured to contain stored concentrate 32 at atmospheric (and/or above atmospheric) temperature and/or pressure, may be located downstream of a preconditioning tank that combines acid and concentrate produced by an upstream concentrator. A recycled raffinate holding tank 40 may contain stored recycled raffinate 42 (e.g., Cu raffinate for a copper metal recovery process), for instance, may contain incoming recycled raffinate 44 which is received from a downstream solvent extraction (SX) circuit. The stored recycled raffinate 42 may make its way, by virtue of one or more pumps 60 and valves 100, to the one or more chambers 22a-d, of the one or more reactors/autoclaves 20. For example, as shown, valves 100 may be positioned adjacent the first 27f, second 27g, third 27h, and/or fourth 27i inlets for recycled raffinate 42, as well as adjacent other inlets and outlets to the one or more reactors/autoclaves 20 as depicted in the figures.

As incoming concentrate 32 progresses from chamber 22a-d to chamber 22a-d, leached shiny may eventually exit the at least one reactor/autoclave 20 via one or more first outlets 28a. The exiting slurry may then be subsequently moved via one or more pumps 60 to a leached slurry holding tank 50 where stored leached slurry 52 is contained. Exiting leached slurry 54 leaving the leached slurry holding tank 50 may be sent to a dewatering process, wherein the solids may be recycled into the leach system 10, sent to tails, and/or separately processed for precious metals (e.g., sent to a smelting process), and wherein the liquids may be moved downstream to a solvent extraction (SX) process which is not shown. Where used herein, the term "pump" as described in the text and shown in the figures as reference numeral 60, may comprise one or more pumps of any type required. For example, in some non-limiting embodiments, centrifugal pumps 60 may be used to move/convey slurry of lesser viscosities, and positive displacement pumps 60 may be used to move/convey grinding media 92 (whether the grinding media is dry, or suspended in a conveying medium). Incoming grinding media 94 may be received into a hopper 90 or placed in an atmospheric or pressurizable holder 96, without limitation. In some preferred embodiments, one or more screw pumps 60 may be advantageously utilized to convey new 92 or used 25 grinding media.

Gas which might build up over time within the vessel body of the at least one reactor/autoclave 20 may leave via one or more second outlets 28b and may enter one or more flash vessels/gas holding vessels 70. The stored gas 72 contained within such a vessel(s) 70 may contain both vaporous phases and/or condensed liquid phases. While not shown, one or more heat exchangers/condensers may be employed to adjacent conduit, or directly to such vessels 70, and liquid removal means such as one or more outlets and valves 100 may be positioned adjacent a lower portion of such a vessel 70 in order to extract condensed liquid which might build up within the vessel 70. Exiting gas 74 (e.g., vapor phase and/or condensed phase) leaving the one or more flash vessels/gas holding vessels 70 may be recycled within the leach system 10, scrubbed/treated for disposal, released into the atmosphere (e.g., as $CO_2$ emissions), or further processed in a separate downstream circuit, without limitation.

The leach system 10 may further comprise a holding tank 80 for containing liquid and/or gas (e.g., liquid oxygen). Stored liquid and/or gas 82 (e.g., liquid oxygen) may leave the holding tank 80 and enter one or more chambers 22a-d of the at least one autoclave 20 via one or more second inlets 27b for introducing incoming liquid and/or gas 84 (e.g., liquid oxygen) and exposing it to the concentrate 32 being leached/mechano-chemically processed within the at least one autoclave 20.

According to some embodiments, a valve 100 may be opened, and new grinding media 92 pumped into at least one chamber 22a-d of at least one reactor/autoclave 20 via a pump 60, wherein the pump 60 may be a positive displacement pump. In some embodiments, the new grinding media 92 may be conveyed to at least one chamber 22a-d of at least one reactor/autoclave 20 via an intermediate grinding media holder 96 or holding chamber 96a-d, as shown in FIGS. 3A-4B. In this regard pressure equalization can be established prior to the step of loading new grinding media 92 into the at least one reactor/autoclave 20. It will be readily understood and appreciated by those having an ordinary skill in the art, that a hopper 90 could be configured to be pressurizable such as grinding media holder 96, and this may somewhat obviate the need for holding chambers 96a-d. It will be readily understood and appreciated by those having an ordinary skill in the art that a hopper 90 may not be necessary, and that new grinding media 92 may be separately loaded into holding chambers 96a-d. Similar or different types of grinding media 92 may be used in each holding chamber 96a-d. Moreover, size distributions, materials, hardness, densities, and/or shapes of grinding media may be similar or may differ for each holding chamber 96a-d, without limitation.

According to some exemplary embodiments (see FIG. 1), valves 100 may be selectively opened and closed, to allow new grinding media 92 to fall, via gravity, into at least one chamber 22a-d of at least one reactor/autoclave 20 via one or more intermediate grinding media holding chambers 96a-d. The intermediate grinding media holding chambers 96*a-d* may initially be depressurized, and may receive new grinding media from a hopper 90 which may be held at atmospheric pressure to facilitate loading. At such time, other valves between the holding chambers 96*a-d* and the at least one reactor/autoclave 20 may be initially closed. A valve 100, which may be a computer-controlled valve, which may be positioned between the hopper 90 and a holding chamber 96*a-d* may then be closed off. Subsequently, a valve 100 between the holding chamber 96*a-d* and at least one reactor/autoclave 20 may be opened to simultaneously pressurize the holding chamber 96*a-d* and release its contents (i.e., the new grinding media 92 contained therein) into at least one respective chamber 22*a-d* of the at least one reactor/autoclave 20 via gravity or via a pressure differential. One or more freeboarding mechanisms comprising parallel conduit and valves may be used to equalize pressures, or create a pressure differential to assist with removing remaining grinding media 92 from a holding chamber 96*a-d*. For example, as shown and inherently suggested from the figures, outlets 28*c*, 28*d*, 28*e*, and 28*f* may be used to flush remaining new grinding media 92 from holding chambers 96*a-d* by using pressure internal to the at least one reactor/autoclave 20.

Figure 5:
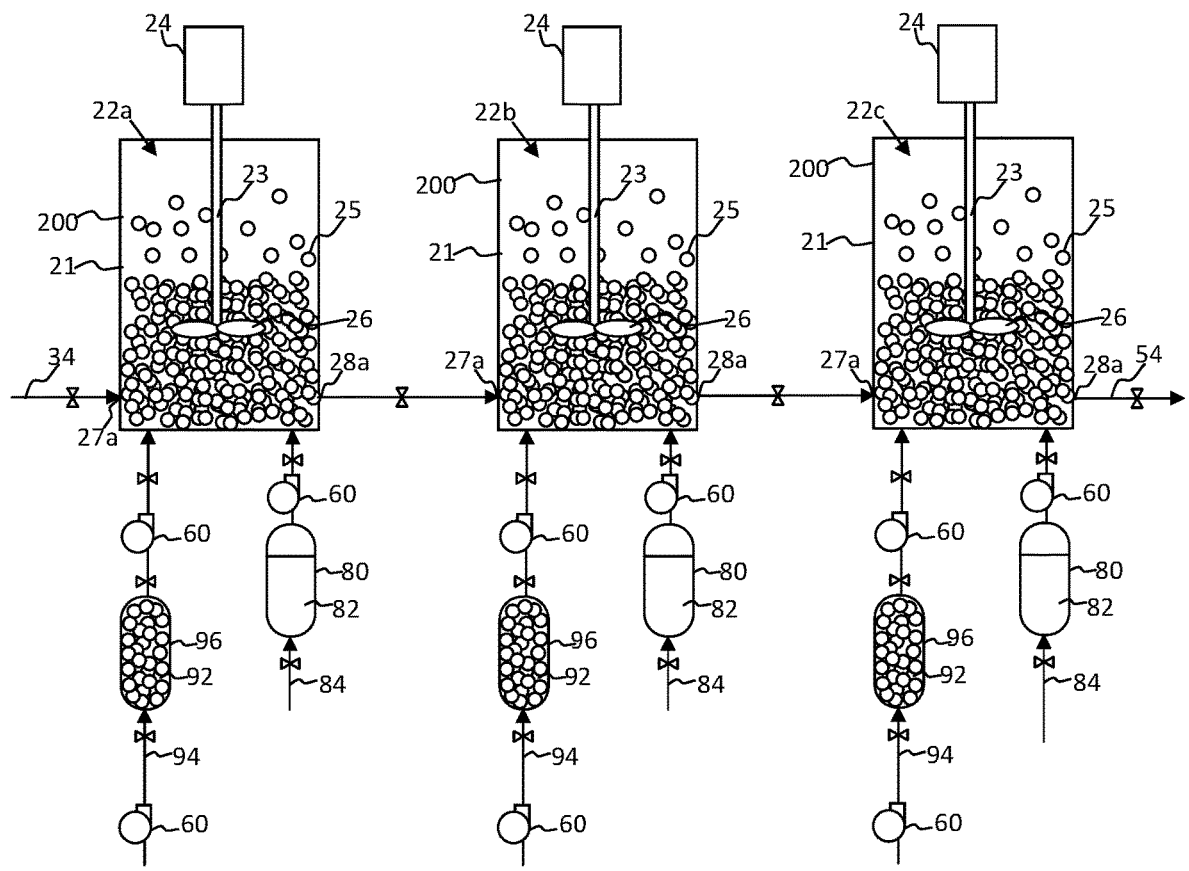
FIG. 5 illustrates a series of reactors comprising shear tank reactors of the stirred-media reactor type (i.e., "SMRt" reactors), which may or may not be capped (i.e., they are preferably pressurizable). The stirred media (SMRt) reactors may or may not be connected in series, as shown, and one or more of them may not be run at an elevated temperature or pressure above atmospheric. Preferably all of the reactors are run at an elevated temperature or pressure above atmospheric. One, some, or each of the stirred media reactors may share similar conditions (e.g., redox potential, pressure, temperature, pH), or one, some or each of the stirred media reactors may operate under different conditions (e.g., redox potential, pressure, temperature, pH). While not shown, one or more other reactors such as one or more autoclaves may be placed between the shown stirred media reactors in series or in parallel, without limitation. Moreover, one, some, or all of the stirred media reactors may operate under similar or different conditions than an adjacent or operatively coupled autoclave 20 or other reactor, without limitation.
Figure 6:
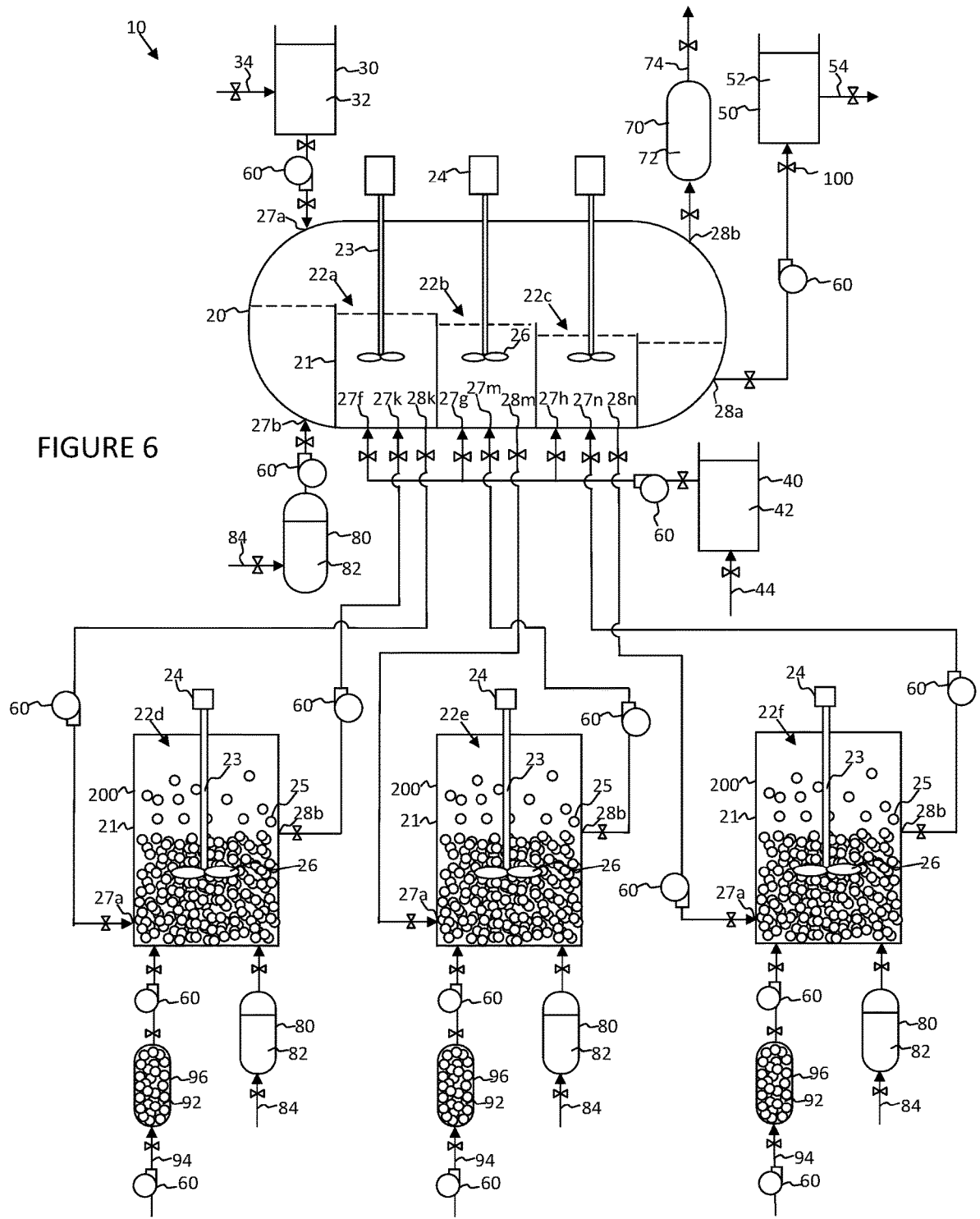
FIG. 6 illustrates a multiple compartment reactor, such as an autoclave comprising a plurality of other reactors configured as stirred media reactors, arranged in parallel with respect to each other (i.e., intra-stage). The stirred media reactors may or may not be capped (i.e., pressurizable). The stirred media reactors may or may not be arranged in series. They may run at atmospheric pressure or an elevated temperature above atmospheric (i.e., greater than ambient pressure). Some or each of the stirred media reactors may share similar conditions (e.g., redox potential, pressure, temperature, pH), or some or each of the stirred media reactors may operate under different conditions (e.g., redox potential, pressure, temperature, pH). Moreover, the stirred media reactors may operate under similar or different conditions than an adjacent or operatively coupled autoclave 20, without limitation.
Figure 7:
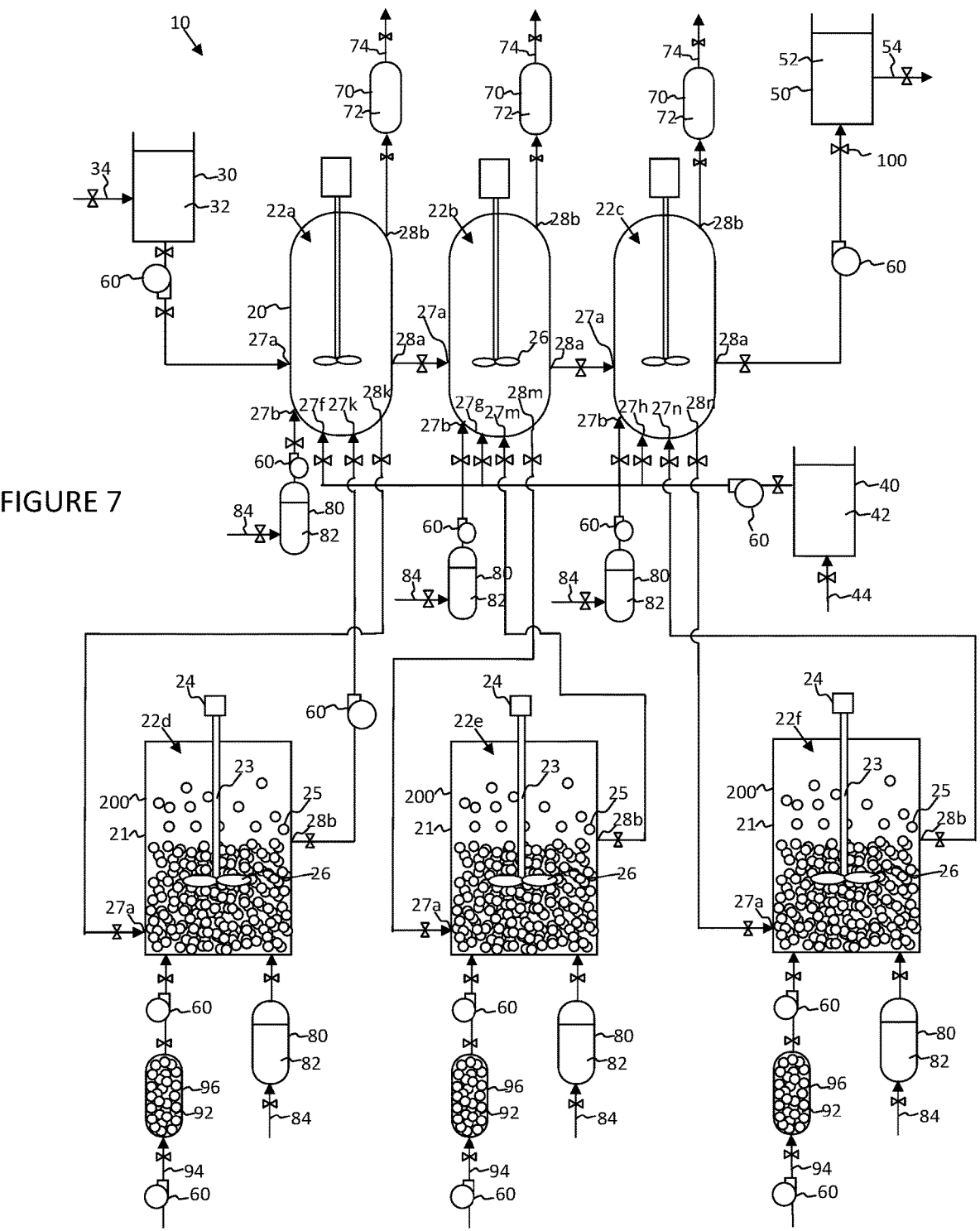
FIG. 7 illustrates yet another embodiment, similar to the embodiment shown and described in FIG. 6, wherein multiple reactors configured as autoclaves 20 may be utilized. Each autoclave 20 reactor may comprise a single compartment or multiple compartments, without limitation.
Figure 8:
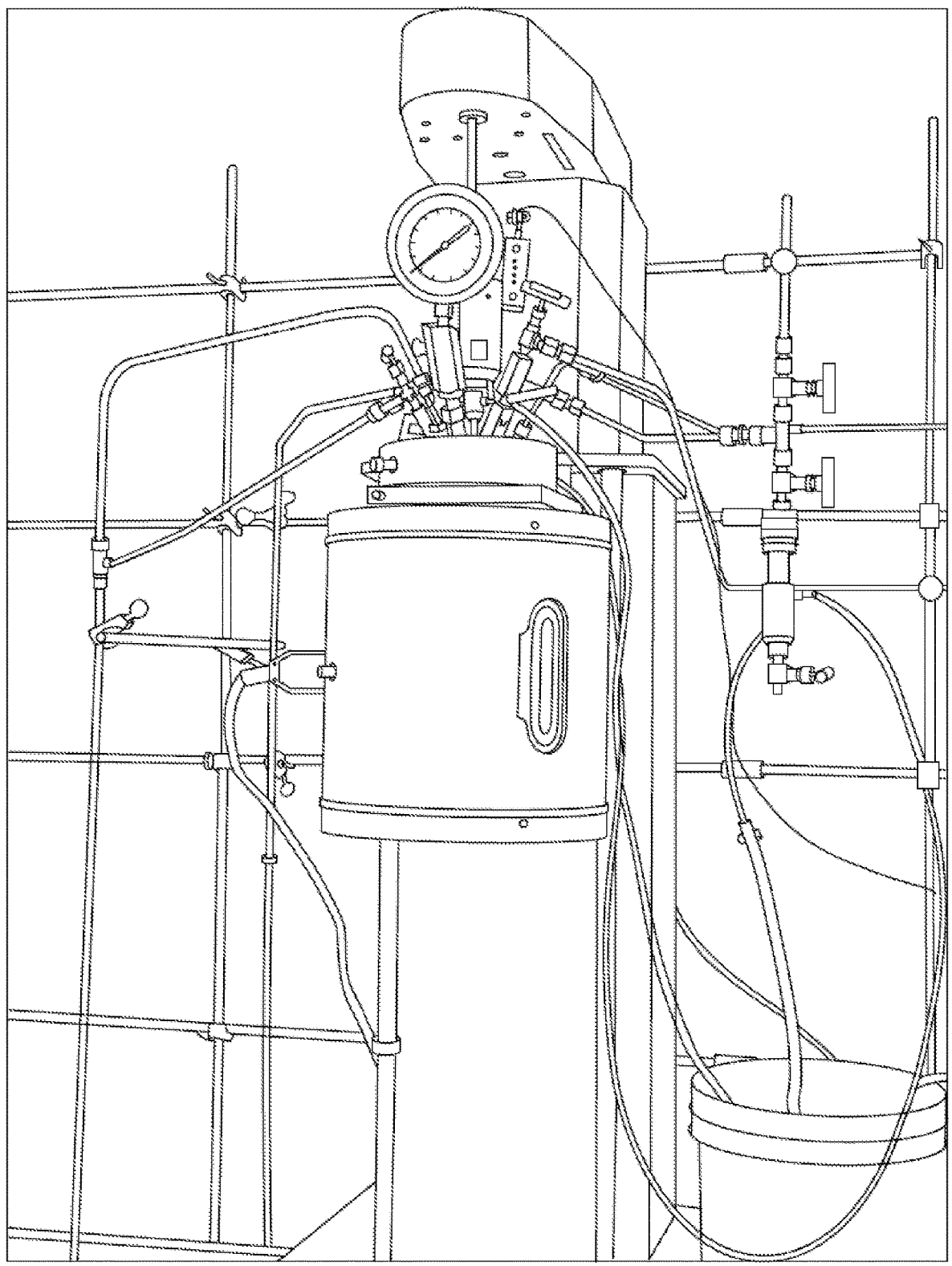
FIGS. 8 and 9 show photographs of a prototype bench-scale test unit which has been utilized for testing purposes.
Figure 9:
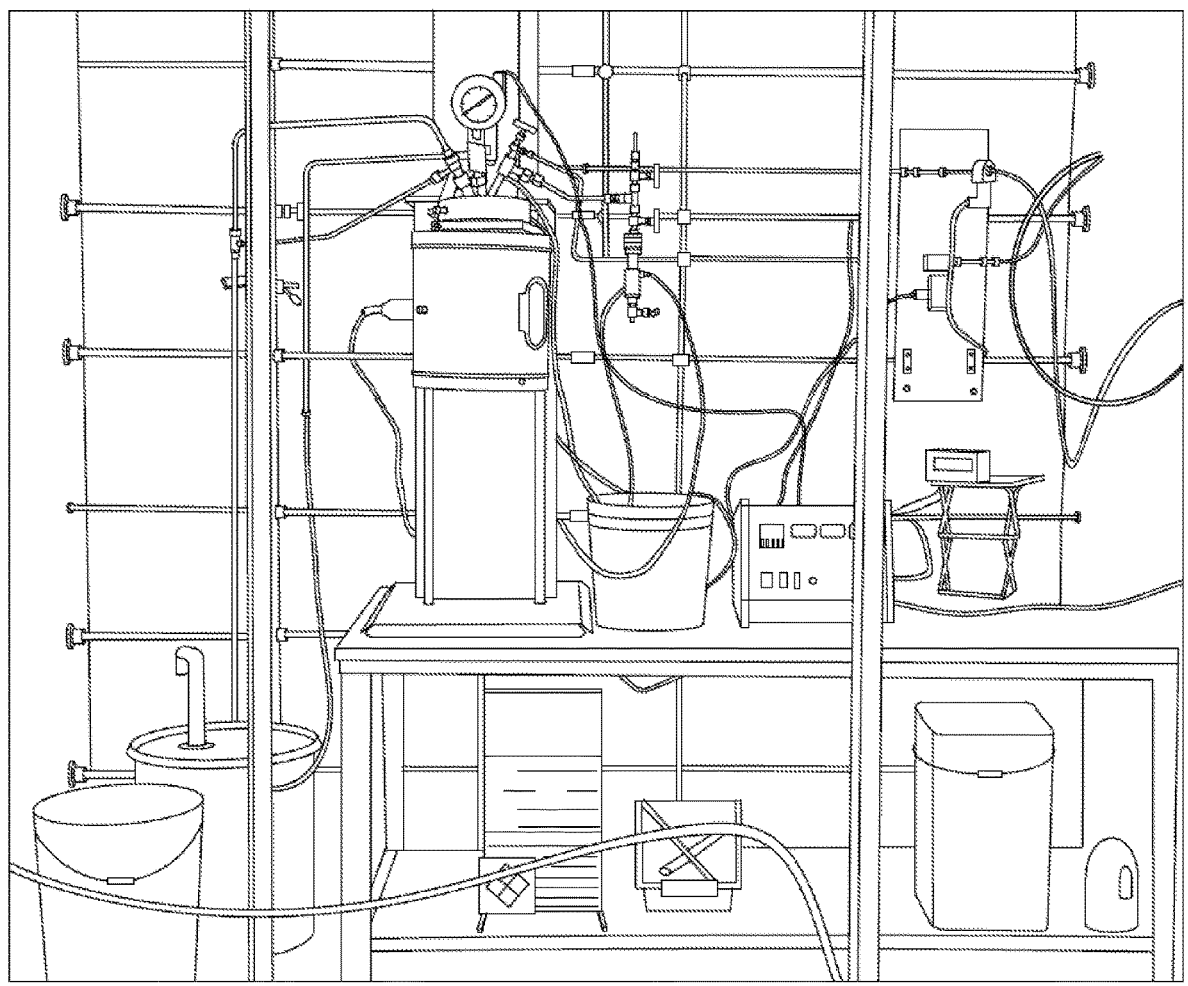

According to some embodiments, as shown in FIG. 5, various combinations of reactors, such as stirred media reactors 200, may be used to define a leach system 10 in accordance with certain embodiments of the present invention. According to some embodiments, as shown in FIGS. 6 and 7, various combinations of reactor/autoclaves 20 and stirred media reactors 200 may be used to define a leach system 10 in accordance with certain embodiments of the present invention. For example, one or more reactors/autoclaves 20, each having one or more compartmental chambers 22*a-d*, may be operatively connected in series, or in parallel, or in a combination/permutation thereof, with one or more stirred media reactors 200 having one or more chambers therein, without limitation. In some embodiments, one or more or all of the reactors/autoclaves 20 may or may not comprise grinding media 25. In some embodiments, some of the stirred media reactors 200 may not comprise grinding media. In some embodiments, some of the chambers 22*a-d* within a reactor/autoclave 20 may not comprise grinding media. Various permutations may exist, wherein chambers of both at least one reactor/autoclave 20 and at least one stirred media reactor 200 may or may not comprise grinding media, so as to be tailored to the particular composition of incoming concentrate 32 and for optimal energy efficiency.

While not shown, in some embodiments, multiple chambers 22*a-d* may share a single stirred media reactor 200 and be operatively connected to or communicate with a single stirred media reactor 200, thereby reducing capital and operating expenditures. In some embodiments, grinding media 92 may be similar or different in mean size distribution and/or density between chambers of reactors/autoclaves 20 and/or stirred media reactors 200. For example, a first chamber 22*a* of a reactor/autoclave 20 may comprise different new grinding media 92 than a second chamber 22*b* of a reactor/autoclave 20, without limitation. As another non-limiting example, a first chamber 22*a* of a reactor/autoclave 20 may comprise different new grinding media 92 than a second chamber 22*b* of a reactor/autoclave 20. As yet another non-limiting example, a first chamber 22*a* of a reactor/autoclave 20 may comprise a different new grinding media 92 than what is used in a chamber of a stirred media reactor 200 which is operatively coupled to said first chamber 22*a*. As yet a further non-limiting example, a first stirred media reactor 200 may comprise a different new grinding media 92 than what is used in a second stirred media reactor 200 which is downstream from the first stirred media reactor 200. As yet a further non-limiting example, a first chamber 22*a* of a reactor/autoclave 20 may comprise grinding media 25, wherein a second chamber 22*b* of the same reactor/autoclave 20 does not comprise grinding media 25. According to another non-limiting example, a first chamber 22*a* of a reactor/autoclave 20 may not comprise grinding media 25, wherein a second chamber 22*b* of the same reactor/autoclave 20 does comprise grinding media 25. According to another non-limiting example, a first chamber 22*a* of a first reactor/autoclave 20 may not comprise grinding media 25, wherein a second chamber 22*b* of another reactor/autoclave 20 does comprise grinding media 25. According to yet another non-limiting example, a first chamber 22*a* of a first reactor/autoclave 20 may comprise grinding media 25, wherein a second chamber 22*b* of another reactor/autoclave 20 does not comprise grinding media 25. Other permutations may exist wherein at least one chamber within a group comprising at least one reactor/autoclave 20 and at least one stirred media reactor 200 comprises grinding media 25.

While not explicitly shown in this application, as suggested in related U.S. Provisional Patent Application No. 62/036,038, filed on 11 Aug. 2014, which is titled: "SYSTEM FOR OPTIMIZING EFFICIENCY OF SMELTING COPPER CONCENTRATES, AND METHODS THEREOF," concentrate (in particular, arsenic-containing concentrates, which might comprise copper arsenic sulphides, enargite, and/or arsenopyrite) and which are produced by a concentrator (e.g., a copper concentrator upstream of the leach system 10) may be measured with analytical equipment to determine a composition of the produced concentrate. The analytical equipment may be used to determine a level, amount, percentage, or concentration of arsenic or other harmful impurities which may invoke penalties or fees according to a smelter contract. The produced concentrate leaving the upstream concentrator (e.g., a copper concentrator downstream of a copper mining operation and upstream of the leach system 10) may be sorted as a function of said level, amount, percentage, or concentration of arsenic or other harmful impurities. On days or time periods or intervals where it is determined that the produced concentrate has a low level, amount, percentage, or concentration of arsenic or other harmful impurities, and/or the level, amount, percentage, or concentration of arsenic or other harmful impurities falls below a predetermined threshold, the produced concentrate may packaged for smelting and/or be sent to a smelter. On days or time periods or intervals where it is determined that the produced concentrate has a high level, amount, percentage, or concentration of arsenic or other harmful impurities, and/or the level, amount, percentage, or concentration of arsenic or other harmful impurities is above a predetermined threshold, the produced concentrate may be temporarily quarantined, and/or sent to a leach system 10 as described herein. The predetermined threshold may be set or adjusted, based upon terms and conditions of a smelting contract, with regard to penalties for impurities.

Though not shown, where inlets 27*a-n* and outlets 28*a-n* are shown in the figures and described herein, there may be provided one or more screens, filter elements, or permeable barriers to prevent new 92 or used 25 grinding media from escaping a particular location. For example, a screen may be permanently or removably affixed to a separation wall 21 adjacent an orifice making up an inlet or an outlet, without limitation. In some embodiments, in addition to, or in lieu of screens, filter elements, or permeable or barriers (not shown), after a particular leach step, grinding media (whether new or used) may be separated from fully or partially-leached shiny 52 by solid-liquid separation techniques such as, cycloning, screening, or the like, without limitation. Washing may take place prior to and/or after solid-liquid separation to ensure that all slurry 52 is removed from the used grinding media 25.

A common or unique size distribution of grinding media 92 may be advantageously utilized. A common size distribution may be made up and maintained by periodically removing all used grinding media 25, and replacing it with all new grinding media 92, wherein each component of the new grinding media 92 comprises a similar mean particle size or diameter. A unique or random size distribution may be made up by removing some or none of the used grinding media 25, and replacing some of it with all new grinding media 92. In some embodiments, a unique or random size distribution may be established by using new grinding media 92 that comprises components having different mean particle sizes or diameters. In this regard, some level of "randomization" with regard to concentrate 32 particle contact with grinding media may be established and maintained. Moreover, greater packing densities of grinding media within a chamber 22a-d may be established. The same principles may also apply for density distributions. For example, a common or unique/random distribution of grinding media type, material, or density may be advantageously utilized with the described apparatus and methods.

Though the systems, components, and methods shown and described herein work primarily well with enargite, it should be appreciated that similar systems, components, and methods may advantageously be used for any one or more of: chalcopyrite leaching, pyrite leaching, arsenopyrite leaching, and/or various combinations thereof, without limitation.

While not shown, in some embodiments, any two or more of the stirred media reactors 200 shown in FIGS. 5-7 may be combined together to create a single chamber defined by a single separation wall 21. Alternatively, in some embodiments, any two or more of the stirred media reactors 200 shown in FIGS. 5-7 may be combined together to create a single stirred media reactor 200 comprising multiple chambers defined by multiple separation walls 21.

According to some embodiments of the present invention, a low pH flotation step and/or low pH solid/liquid separation step (not shown in this particular application but described in the above referenced co-pending applications) may be made, in order to separate out gangue (e.g., pyrite), remove impurities, and/or extract and concentrate other mineral values (e.g., molybdenum, precious metals) from a metal sulfide concentrate, prior to an oxidative leaching step which makes use of the apparatus, systems, and methods of the leach system 10 disclosed herein. In this regard, the amount of metal sulfide concentrate being processed in the oxidative leach step may be minimized and operating (OPEX) expenditures such as consumable reagent costs may be reduced. Moreover, a reductive leach or pretreatment process may be employed prior to an oxidative leaching step which makes use of the apparatus, systems, and methods of the leach system 10 disclosed herein. In this regard, feeds comprising a large amount of chalcopyrite may experience favorable leach kinetics and more rapid leach times than what might normally be expected.

In some embodiments, substantially complete conversion of sulfide to sulfate (i.e., "burn-up" or "oxidation" of substantially all sulfur within the concentrate being leached) may be performed through the use of leach systems 10 according to some embodiments.

Example 1

Figure 10:
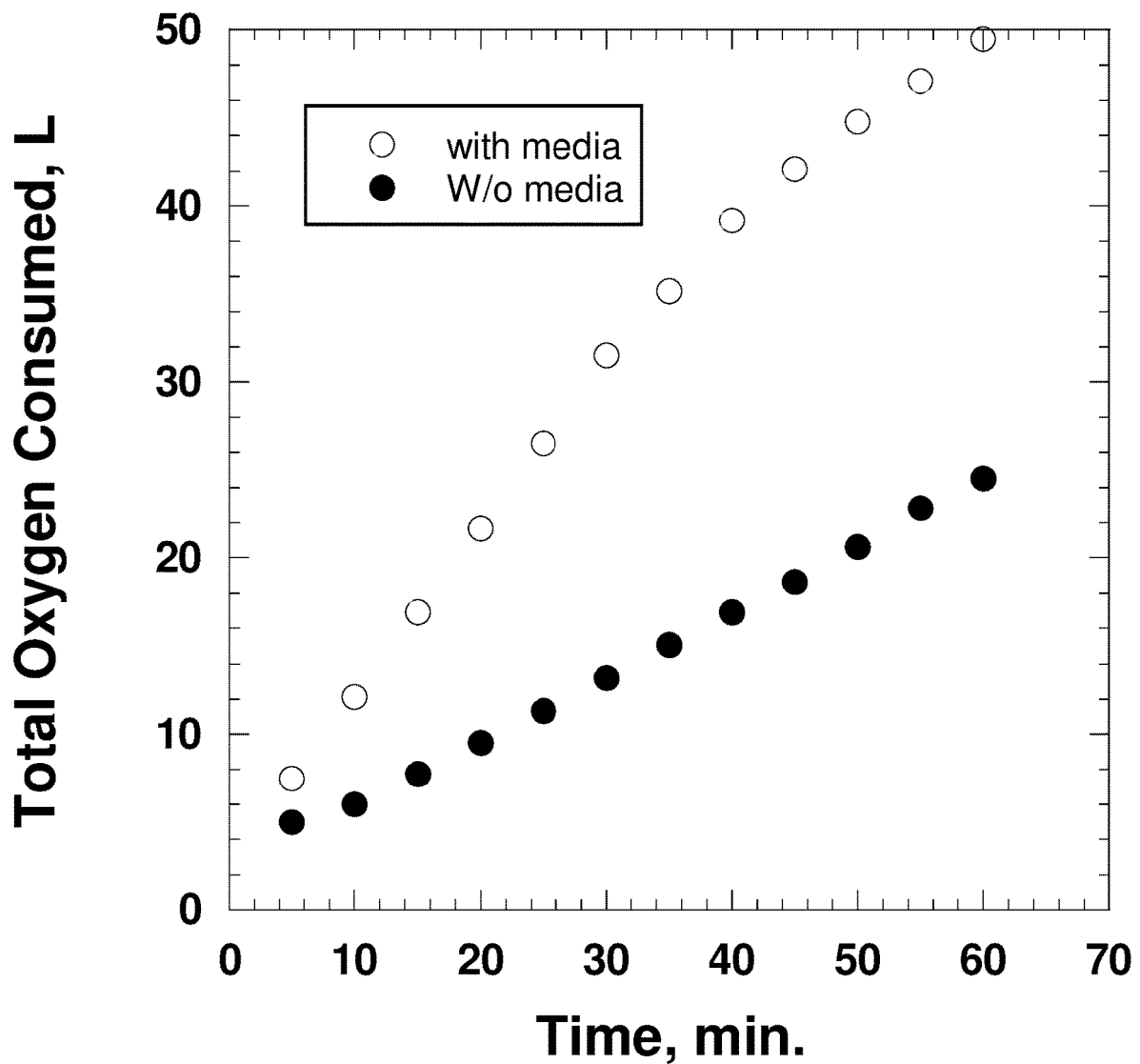
FIG. 10 shows the rate of oxygen ($O_2$) consumption during leach tests using one embodiment of apparatus, systems, and methods disclosed.

A series of leach tests were conducted to illustrate the superior performance of one or more embodiments of the inventive method. A flotation concentrate containing a mixture of primary and secondary copper sulfides, including enargite, were leached at 10 wt. % solids and 145° C. in a ferric sulfate lixivant. The total pressure within the leach vessel (i.e., steam+oxygen) was approximately 7.5 bar. Cooling was provided to maintain a constant temperature throughout the tests. One of the leach tests was carried out with the addition of ceramic grinding media to illustrate the benefits of the invention. A reference test was also performed under identical conditions except that no grinding media were included. The vessel was sealed and heated, then purged with 1 L of O2. The reactors were maintained under constant oxygen partial pressure during the course of the leach tests. As the oxidative leach reactions progressed, O2 flow from a compressed cylinder into the reactor was recorded. The rate of O2 consumption during the tests is plotted in FIG. 10. Those skilled in the art will recognize that the oxidative leach reaction in the presence of the grinding media was significantly faster than the reference test which was run in the absence of grinding media. Without wishing to be limited to any specific theory, we believe that the action or effect of the grinding media substitutes for increased temperatures in accelerating chemical reactions. In other words, equivalent reaction rates and extents of reaction may be able to be achieved at significantly lower reactor temperatures in a pressurized stirred media reactor as compared to a conventional autoclave which does not employ grinding media. In some cases, reactions requiring temperatures of 180-220° C. may be able to be performed at temperatures as low as 120-140° C. and at comparable times. In the instant case, it was observed that substantially complete conversion of sulfide to sulfate (i.e., "burn-up" or "oxidation" of substantially all sulfur within the concentrate being leached) occurred at approximately 145° C., though it is believed that temperatures approaching 100-110° C. may provide similar results.

It should be known that the particular features, processes, and benefits which are shown and described herein in detail are purely exemplary in nature and should not limit the scope of the invention. Moreover, although the invention has been described in terms of particular embodiments and applications, one of ordinary skill in the art, in light of this teaching, can generate additional embodiments and modifications without departing from the spirit of or exceeding the scope of the claimed invention. For example, where used herein, and when referring to co-pending related applications, the terms "autoclave", "stirred media reactor", "SMRt reactor", "smart reactor", and "attrition scrubber" may share one or more mechanical features, and/or may share one or more similarities in function, without limitation. In some embodiments, where used herein and in other co-pending applications mentioned, the terms "stirred media reactor", "SMRt reactor", and/or "smart reactor" may be thought of as a "modified autoclave" and/or a "modified attrition scrubber" which is used in a leach system 10. For instance, according to some embodiments, a "stirred media reactor", "SMRt reactor", and/or "smart reactor" may be built more cheaply at a lower cost than a conventional autoclave and may not be necessarily configured to withstand as high of pressures or as high of temperatures as a conventional autoclave in a more traditional sense. For instance, in some embodiments, a "stirred media reactor", "SMRt reactor", and/or "smart reactor" may not require a brick liner, and may merely require a polytetrafluoroethylene liner or the like. In some embodiments, a "stirred media reactor", "SMRt reactor", and/or "smart reactor" may be configured to receive, contain, and/or remove grinding media from within—something not found with traditional autoclaves used for leaching.

The term "autoclave," where used herein, may comprise its plain meaning within the metal beneficiation or extractive metallurgy arts, or may comprise a reactor or leach reactor which can be used for metal beneficiation or extractive metallurgy, in particular, a reactor or leach reactor which is configured to operate at high temperatures and/or high pressures, without limitation. The terms "reactor" and "autoclave" where they appear in this description (or claims) may be used interchangeably, without departing from the scope and intent of this disclosure.

Accordingly, it is to be understood that the drawings and descriptions herein are proffered by way of example to facilitate comprehension of the invention and should not be construed to limit the scope thereof.

REFERENCE NUMERAL IDENTIFIERS

10 Leach System
20 Leach reactor/Autoclave
21 Separation wall
22a First chamber/compartment
22b Second chamber/compartment
22c Third chamber/compartment
22d Fourth chamber/compartment
22e Fifth chamber/compartment
22f Sixth chamber/compartment
23 Shaft
24 Drive (e.g., including electric or hydraulic motor, transmission, gearing, etc.)
25 In-use/Used grinding media
26 Stirrer means (e.g., impeller, paddle, rotor, hydrofoil, stirrer)
27a First inlet for concentrate ingress
27b Second inlet for liquid and/or gas ingress (e.g., liquid oxygen)
27c First inlet for grinding media
27d Second inlet for grinding media
27e Third inlet for grinding media
27f First inlet for recycled raffinate (e.g., Cu raffinate)
27g Second inlet for recycled raffinate (e.g., Cu raffinate)
27h Third inlet for recycled raffinate (e.g., Cu raffinate)
27i Fourth inlet for recycled raffinate (e.g., Cu raffinate)
27j Fourth inlet for grinding media
27k First inlet for slurry coming from stirred media reactor
27m Second inlet for slurry coming from stirred media reactor
27n Third inlet for slurry coming from stirred media reactor
28a First outlet for slurry discharge
28b Second outlet for gas discharge
28c First outlet for freeboard gas flush of grinding media in holding chamber
28d Second inlet for freeboard gas flush of grinding media in holding chamber
28e Third outlet for freeboard gas flush of grinding media in holding chamber
28f Fourth outlet for freeboard gas flush of grinding media in holding chamber
28k First outlet for slurry to stirred media reactor
28m Second outlet for slurry to stirred media reactor
28n Third outlet for slurry to stirred media reactor
30 Concentrate holding tank (e.g., downstream from preconditioning tank not shown)
32 Stored concentrate
34 Incoming concentrate (e.g., received from upstream preconditioning tank not shown)
40 Recycled raffinate holding tank
42 Stored recycled raffinate (e.g., Cu raffinate)
44 Incoming recycled raffinate (e.g., Cu raffinate)
50 Leached slurry holding tank
52 Stored Leached slurry
54 Exiting leached slurry
60 Pump (e.g., centrifugal, positive displacement)
70 Flash vessel/Gas holding vessel
72 Stored gas (e.g., vapor phase and/or condensed phase)
74 Exiting gas (e.g., vapor phase and/or condensed phase)
80 Holding tank for liquid and/or gas (e.g., liquid oxygen)
82 Stored liquid and/or gas (e.g., liquid oxygen)
84 Incoming liquid and/or gas (e.g., liquid oxygen)
90 Hopper for grinding media
92 New grinding media
94 Incoming grinding media
96 Grinding media holder
96a First grinding media holding chamber
96b Second grinding media holding chamber
96c Third grinding media holding chamber
96d Fourth grinding media holding chamber
100 Valve
200 Stirred media reactor (i.e., "SMRt" reactor, "attrition scrubber")

What is claimed is:

1. A method of leaching a metal sulfide, comprising:
providing a metal sulfide concentrate to at least one chamber of at least one autoclave leach reactor; the at least one chamber comprising grinding media therein; the grinding media comprising material which is non-native to the metal sulfide concentrate;
leaching the metal sulfide concentrate in said at least one chamber in the presence of oxygen at a pressure above ambient, and in the presence of the grinding media within the at least one chamber, wherein the grinding media within the at least one chamber contacts the metal sulfide concentrate inside of the at least one chamber;
separating new or used grinding media from fully or partially-leached slurry by solid-liquid separation techniques and,
oxidizing the metal sulfide within the metal sulfide concentrate to a metal sulfate.

2. The method of claim 1, wherein the grinding media comprises partially used or new grinding media.

3. An autoclave configured for leaching a metal sulfide, the autoclave comprising at least one compartment and grinding media, a first inlet for receiving a metal sulfide concentrate produced via flotation, a first outlet for removing a leached slurry from the autoclave, means for introducing new grinding media to the at least one compartment of the autoclave, and one or more screens, filter elements, or permeable barriers to prevent new or used grinding media from escaping; wherein the grinding media comprises material which is non-native to the metal sulfide concentrate.

4. The autoclave of claim 3, wherein the means for introducing the new grinding media to the autoclave comprises one or more hoppers.

5. The autoclave according to claim 3, wherein the means for introducing the new grinding media to the autoclave comprises one or more holding chambers.

6. An autoclave for leaching a metal sulfide, comprising:
- a first inlet for receiving a metal sulfide concentrate produced via flotation;
- a second inlet for receiving a liquid or gas containing oxygen;
- a third inlet for receiving new grinding media comprising material which is non-native to the metal sulfide concentrate;
- a first outlet for removing a leached slurry from the autoclave;
- a second outlet for gas discharge;
- at least one compartment containing grinding media configured to disrupt a crystal lattice structure of metal sulfide particles in the metal sulfide concentrate; the grinding media comprising material which is non-native to the metal sulfide concentrate; and
- one or more screens, filter elements, or permeable barriers to prevent new or used grinding media from escaping.

* * * * *